(12) United States Patent
Wu et al.

(10) Patent No.: US 10,735,309 B2
(45) Date of Patent: Aug. 4, 2020

(54) TRAFFIC CLASSIFIER, SERVICE ROUTING TRIGGER, AND PACKET PROCESSING METHOD AND SYSTEM

(71) Applicant: Huawei Technologies Co., Ltd., Shenzhen (CN)

(72) Inventors: Dongjun Wu, Shenzhen (CN); Changjiang Yan, Beijing (CN); Shibi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 14/924,499

(22) Filed: Oct. 27, 2015

(65) Prior Publication Data

US 2016/0050141 A1 Feb. 18, 2016

Related U.S. Application Data

(63) Continuation of application No. PCT/CN2013/075003, filed on Apr. 28, 2013.

(51) Int. Cl.
*H04L 12/24* (2006.01)
*H04L 12/707* (2013.01)
(Continued)

(52) U.S. Cl.
CPC .......... *H04L 45/22* (2013.01); *H04L 41/5054* (2013.01); *H04L 43/028* (2013.01); *H04L 45/306* (2013.01)

(58) Field of Classification Search
CPC ..... H04L 45/22; H04L 43/028; H04L 45/306; H04L 47/125; H04L 67/1002;
(Continued)

(56) References Cited

U.S. PATENT DOCUMENTS 7,561,580 B1 * 7/2009 Johri .................. H04L 41/0806
370/395.5
2008/0177896 A1 7/2008 Quinn et al.
(Continued)

FOREIGN PATENT DOCUMENTS

CN 101635676 A 1/2010
CN 1020140443 A 4/2011
(Continued)

OTHER PUBLICATIONS

So, N. et al., "BGP IP VPN Virtual PE," Internet-Draft, Intended Status: Standards Track, Expires: Oct. 7, 2013, TATA Communications, Apr. 7, 2013, 25 pages.
(Continued)

*Primary Examiner* — Kodzovi Acolatse
*Assistant Examiner* — The Hy Nguyen
(74) *Attorney, Agent, or Firm* — Slater Matsil, LLP

(57) ABSTRACT

A packet processing method includes: a traffic classifier receives a first packet; the traffic classifier determines, in policy information in the traffic classifier and according to a first filtering rule that matches the first packet, a first service identifier that matches the first filtering rule, and an address, which matches the first filtering rule, of a first service routing trigger. The traffic classifier sends a second packet to the first service routing trigger. Where the policy information includes: a filtering rule, an address of a service routing trigger, and a service identifier corresponding to the filtering rule. Where the filtering rule is used to identify a packet, and the service identifier is used to represent a sequence of a service node that processes the packet. Where the second packet is formed by adding the first service identifier to the first packet.

13 Claims, 10 Drawing Sheets

(51) Int. Cl.
  *H04L 12/725* (2013.01)
  *H04L 12/26* (2006.01)
(58) Field of Classification Search
  CPC .............. H04L 12/00; H04L 12/40071; H04L 67/1036; H04L 29/12009; H04L 61/25; H04W 28/00
  USPC ................................................. 370/218, 902
  See application file for complete search history.

(56) References Cited

U.S. PATENT DOCUMENTS

| | | | |
|---|---|---|---|
| 2011/0161494 A1* | 6/2011 | McDysan | H04L 45/306 709/225 |
| 2012/0163386 A1 | 6/2012 | Wang | |
| 2012/0230325 A1* | 9/2012 | Haddock | H04L 12/4633 370/357 |
| 2014/0003433 A1* | 1/2014 | Narayanaswamy | H04L 67/327 370/392 |
| 2014/0314094 A1* | 10/2014 | Saltsidis | H04L 47/34 370/394 |

FOREIGN PATENT DOCUMENTS

| | | |
|---|---|---|
| CN | 102056333 A | 5/2011 |
| CN | 102098349 A | 6/2011 |
| CN | 102571602 A | 7/2012 |
| CN | 103051535 A | 4/2013 |

OTHER PUBLICATIONS

Fernando, R. et al., "Virtual Topologies for Service Chaining in BGP IP VPNs," Internet-Draft, Intended Status: Standards Track, Expires: Aug. 25, 2013, TATA Communications, Feb. 25, 2013, 16 pages.

\* cited by examiner

| Service routing trigger or service routing trigger group | Service identifier | First service node | Second service node | ... | Last service node |
|---|---|---|---|---|---|
| | Service identifier 1 | Antivirus | Firewall | ... | NAT |
| | Service identifier 2 | Application caching and acceleration | Firewall | ... | NAT |
| | ... | ... | ... | ... | ... |
| | Service identifier n | ... | ... | ... | ... |

FIG. 2(a)

| Service routing trigger | Service identifier | First service node | Second service node | ... | Last service node |
|---|---|---|---|---|---|
| Service routing trigger 1 | Service identifier 1 | Antivirus | Firewall | ... | NAT |
| Service routing trigger 2 | Service identifier 2 | Application caching and acceleration | Firewall | ... | NAT |
| ... | ... | ... | ... | ... | ... |
| Service routing trigger n | Service identifier n | ... | ... | ... | ... |

FIG. 2(b)

| Service routing trigger | Tenant identifier | Service identifier | First service node | Second service node | ... | Last service node |
|---|---|---|---|---|---|---|
| Service routing trigger 1 | Tenant identifier 1 | Service identifier 1 | Antivirus | Firewall | ... | NAT |
| Service routing trigger 2 | Tenant identifier 2 | Service identifier 2 | Application caching and acceleration | Firewall | ... | NAT |
| ... | ... | ... | ... | ... | ... | ... |
| Service routing trigger n | Tenant identifier 3 | Service identifier n | ... | ... | ... | ... |

FIG. 2(c)

TRAFFIC CLASSIFIER, SERVICE ROUTING TRIGGER, AND PACKET PROCESSING METHOD AND SYSTEM

This application is a continuation of International Application No. PCT/CN2013/075003, filed on Apr. 28, 2013, which is hereby incorporated by reference in its entirety.

TECHNICAL FIELD

The present disclosure relates to the communications field, in particular, to a packet processing method, device, and system.

BACKGROUND

On a data center network, service processing based on open system interconnection (OSI) layer 4 to layer 7 usually needs to be performed on a packet. For example, service processing generally includes: providing firewall processing, network address translation (NAT), home control, and the like. Different service processing may need to be provided for different packets, and multiple service processing may need to be provided for a packet, for example, firewall processing and NAT processing may need to be performed on some packets, and firewall processing and home control processing may be expected for some other packets. In this case, how to implement service processing on a packet is an issue to be resolved.

SUMMARY

An objective of embodiments of the present disclosure is to provide a traffic classifier, a service routing trigger, and a packet processing method and system, so as to resolve a problem of service processing on a packet.

To achieve the foregoing objective, the embodiments of the present disclosure use the following technical solutions.

According to a first aspect, an embodiment of the present disclosure provides a packet processing system, including a controller, a traffic classifier, and a first service routing trigger, where the controller is configured to send first policy information to the traffic classifier, where the first policy information includes: a filtering rule, an address that is corresponding to the filtering rule and is of a service routing trigger, and a service identifier corresponding to the filtering rule, where the filtering rule is used to identify a packet, and the service identifier is used to represent a sequence of a service node that processes the packet;

the controller is further configured to send second policy information to the first service routing trigger, where the second policy information includes: the service identifier, and a service node sequence that is corresponding to the service identifier;

the traffic classifier is configured to receive the first policy information sent by the controller;

the traffic classifier is further configured to: receive a first packet; determine, in the first policy information and according to a first filtering rule that matches the first packet, a first service identifier that matches the first filtering rule, and an address that matches the first filtering rule and is of the first service routing trigger; and send a second packet to the first service routing trigger, where the second packet includes the first service identifier; and the first service routing trigger is configured to: determine, in the second policy information and according to the first service identifier carried in the second packet, a first service node sequence that matches the first service identifier; and successively trigger one or more service nodes in the first service node sequence to process the second packet.

In some implementations, the first policy information further includes a tenant identifier, and the service identifier is corresponding to the filtering rule and the tenant identifier.

In some implementations, the traffic classifier is specifically configured to: determine, in the first policy information and according to a first tenant identifier corresponding to the first filtering rule and the first packet, the first service identifier that matches the first filtering rule and the first tenant identifier, and an address that matches the first filtering rule and the first tenant identifier and is of the first service routing trigger; and send the second packet to the first service routing trigger.

In some implementations, the second policy information further includes an address of a next-hop node of the service node sequence corresponding to the service identifier.

According to a second aspect, an embodiment of the present disclosure provides a packet processing system, including a controller, a traffic classifier, a first service routing trigger, and a second service routing trigger, where the controller is configured to send first policy information to the traffic classifier, where the first policy information includes: a filtering rule, an address that is corresponding to the filtering rule and is of a service routing trigger, and a service identifier corresponding to the filtering rule, where the filtering rule is used to identify a packet, and the service identifier is used to represent a sequence of a service node that processes the packet;

the controller is further configured to send second policy information to the first service routing trigger, where the second policy information includes: the service identifier, and a part that is triggered by the first service routing trigger and is of a service node sequence corresponding to the service identifier;

the controller is further configured to send third policy information to the second service routing trigger, where the third policy information includes: the service identifier, and a part that is triggered by the second service routing trigger and is of the service node sequence corresponding to the service identifier;

the traffic classifier is configured to receive the first policy information sent by the controller;

the traffic classifier is further configured to: receive a first packet; determine, in the first policy information and according to a first filtering rule that matches the first packet, a first service identifier that matches the first filtering rule, an address that matches the first filtering rule and is of the first service routing trigger, and an address that matches the first filtering rule and is of the second service routing trigger; and send a second packet to the first service routing trigger, where the second packet includes the first service identifier;

the first service routing trigger is configured to: determine, in the second policy information and according to the first service identifier carried in the second packet, a first service node sequence that matches the first service identifier; and after successively triggering one or more service nodes in the first service node sequence to process the second packet, send the processed second packet to the second service routing trigger; and the second service routing trigger is configured to: determine, in the third policy information and according to the first service identifier carried in the processed second packet, a second service node sequence that matches the first service identifier; and successively trigger one or more service nodes in the second service node sequence to process the second packet.

In some implementations, the first policy information further includes a tenant identifier, and the service identifier is corresponding to the filtering rule and the tenant identifier.

In some implementations, the traffic classifier is specifically configured to: determine, in the first policy information and according to a first tenant identifier corresponding to the first filtering rule and the first packet, the first service identifier that matches the first filtering rule and the first tenant identifier, and the address that matches the first filtering rule and is of the first service routing trigger; and send the second packet to the first service routing trigger.

In some implementations, the second policy information further includes an address of a next-hop node of the service node sequence corresponding to the service identifier.

According to a third aspect, an embodiment of the present disclosure provides a packet processing method, including:

receiving, by a traffic classifier, a first packet;

determining, by the traffic classifier, in policy information stored in the traffic classifier and according to a first filtering rule that matches the first packet, a first service identifier that matches the first filtering rule, and an address that matches the first filtering rule and is of a first service routing trigger, where the policy information includes: a filtering rule, an address of a service routing trigger, and a service identifier corresponding to the filtering rule, where the filtering rule is used to identify a packet, and the service identifier is used to represent a sequence of a service node that processes the packet; and sending, by the traffic classifier, a second packet to the first service routing trigger, where the second packet is formed by adding the first service identifier to the first packet.

In some implementations, the policy information further includes a tenant identifier, and the service identifier is corresponding to the filtering rule and the tenant identifier; and the step of determining the first service identifier by the traffic classifier is specifically: determining, by the traffic classifier, in the policy information and according to a first tenant identifier corresponding to the first filtering rule and the first packet, the first service identifier that matches the first filtering rule and the first tenant identifier, and the address of the first service routing trigger.

In some implementations, before the receiving, by the traffic classifier, the first packet, the method further includes: receiving, by the traffic classifier, the policy information sent by a controller.

According to a fourth aspect, an embodiment of the present disclosure provides a packet processing method, including:

receiving, by a service routing trigger, a first packet, where the first packet carries a first service identifier;

determining, by the service routing trigger, in policy information stored in the service routing trigger and according to the first service identifier, a first service node sequence that matches the first service identifier; and successively triggering, by the service routing trigger, according to the first service node sequence, one or more service nodes in the first service node sequence to process the first packet.

In some implementations, before the receiving, by the service routing trigger, the first packet sent by a traffic classifier, further including: receiving, by the service routing trigger, the policy information sent by a controller.

In some implementations, the policy information includes the service identifier, and a service node sequence that matches the service identifier, and the service identifier is used to represent a sequence of a service node that processes a packet.

In some implementations, the policy information further includes an address of a service node in the service node sequence.

In some implementations, the policy information further includes an address of a next-hop node of the service node sequence corresponding to the service identifier; and the method further includes: after a last service node in the first service node sequence has processed the first packet, sending, by the service routing trigger, the processed first packet to a next-hop node of the service node sequence.

According to a fifth aspect, an embodiment of the present disclosure provides a packet processing method, including:

receiving, by a first service routing trigger, a first packet, where the first packet carries a first service identifier;

determining, by the first service routing trigger, in first policy information stored in the first service routing trigger and according to the first service identifier, a first service node sequence that matches the first service identifier, and an address of a second service routing trigger;

forwarding, by the first service routing trigger, the first packet to the second service routing trigger after successively triggering, according to the first service node sequence, one or more service nodes in the first service node sequence to process the first packet;

determining, by the second service routing trigger, in second policy information in the second service routing trigger and according to the first service identifier, a second service node sequence that matches the first service identifier; and successively triggering, by the second service routing trigger, according to the second service node sequence, one or more service nodes in the second service node sequence to process the first packet.

In some implementations, before the receiving, by the first service routing trigger and the second service routing trigger, the first packet, the method further includes: receiving, by the first service routing trigger, the first policy information sent by a controller, and receiving, by the second service routing trigger, the second policy information sent by the controller.

According to a sixth aspect, an embodiment of the present disclosure provides a traffic classifier, including a receiving unit, a storage unit, a processing unit, and a sending unit, where the receiving unit is configured to receive a first packet;

the storage unit is configured to store policy information;

the processing unit is configured to: determine in the policy information stored in the storage unit and according to a first filtering rule that matches the first packet, a first service identifier that matches the first filtering rule, and an address that matches the first filtering rule and is of a first service routing trigger; and trigger the sending unit to send a second packet to the first service routing trigger, where the second packet is formed by adding the first service identifier to the first packet; and the sending unit is configured to send the second packet to the first service routing trigger.

In some implementations, the receiving unit is further configured to receive the policy information sent by a controller.

In some implementations, the policy information includes: a filtering rule, an address of a service routing trigger, and a service identifier corresponding to the filtering rule, where the filtering rule is used to identify a packet, and the service identifier is used to represent a sequence of a service node that processes the packet.

In some implementations, the policy information further includes a tenant identifier, and the service identifier is corresponding to the filtering rule and the tenant identifier; and the processing unit is specifically configured to:

determine, in the policy information and according to a first tenant identifier corresponding to the first filtering rule and the first packet, the first service identifier that matches the first filtering rule and the first tenant identifier, and an address that matches the first filtering rule and the first tenant identifier and is of the first service routing trigger; and trigger the sending unit to send the second packet to the first service routing trigger.

According to a seventh aspect, an embodiment of the present disclosure provides a service routing trigger, including a receiving unit, a processing unit, and a triggering unit, where the receiving unit is configured to receive a first packet, where the first packet carries a first service identifier;

the processing unit determines, in policy information stored in the service routing trigger and according to the first service identifier, a first service node sequence that matches the first service identifier, and an address of a service node in the first service node sequence; and the triggering unit is configured to successively trigger, according to the first service node sequence, one or more service nodes in the first service node sequence to process the first packet.

In some implementations, the receiving unit is further configured to receive the policy information sent by a controller.

In some implementations, the policy information includes a service identifier, and a service node sequence that matches the service identifier, and the service identifier is used to represent a sequence of a service node that processes a packet.

In some implementations, the policy information further includes an address of a service node in the service node sequence.

In some implementations, the policy information further includes an address of a next-hop node of the service node sequence.

In the technical solutions of the embodiments of the present disclosure, a controller sends first policy information to a traffic classifier and sends second policy information to a service routing trigger, and the traffic classifier and the service routing trigger process packets according to received policy information, which implements unified management of the traffic classifier and the service routing trigger by the controller. Further, the traffic classifier adds, according to the first policy information, a service identifier to a packet that is identified as a packet on which service processing needs to be performed, and sends, to the service routing trigger, the packet to which the service identifier is added; and the service routing trigger controls and triggers a service node in a service node sequence corresponding to the service identifier to process the packet, and normally forwards a processed packet according to a routing table, which implements service processing on the packet. In addition, a service node only needs to perform service processing on a packet according to control and triggering of the service routing trigger, and therefore, a mechanism in the present disclosure is compatible with service nodes with various different service capabilities.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings in these accompanying drawings without creative efforts.

FIG. 2(a) to FIG. 2(c) are schematic diagrams of a first policy information table in a packet processing system according to Embodiment 1 of the present disclosure;

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a user access device may be a gateway GPRS (General Packet Radio Service) support node (GGSN)/a PDN (packet data network) gateway (P-GW) in the mobile broadband access field, a broadband network gateway (BNG) in the fixed access field, or a top of rack (ToR) switch in data center application.

The service node mentioned in the embodiments of the present disclosure may be a physical entity device, for example, a network device such as a router, a switch, or a server, or may be a logical functional entity or an application, for example, a firewall, or an NAT (Network Address Translation) device; and the service node may also be a service node instance. The service node mentioned in the embodiments of the present disclosure may be applied in a value-added service or a special service.

The traffic classifier mentioned in the embodiments of the present disclosure may be a physical entity device, for example, a network device such as a router, a switch, or a server, or may be a logical functional entity or an application providing a service classification function; and the traffic classifier may also be a service instance providing a service classification function.

The service routing trigger mentioned in the embodiments of the present disclosure may be a physical entity device, for example, a network device such as a router, a switch, or a server, or may be a logical functional entity or an application providing a function of triggering service routing; and the service routing trigger may also be a service instance providing a function of triggering service routing.

The controller mentioned in the embodiments of the present disclosure may be a physical entity device, for example, a network device such as a router, a switch, or a server, or may be a logical functional entity or an application providing a control function; and the controller may also be a service instance providing a control function.

The address mentioned in the embodiments of the present disclosure may be an Internet Protocol (IP) address or a media access control (MAC) address of the service routing trigger.

Embodiment 1

Figure 1A:
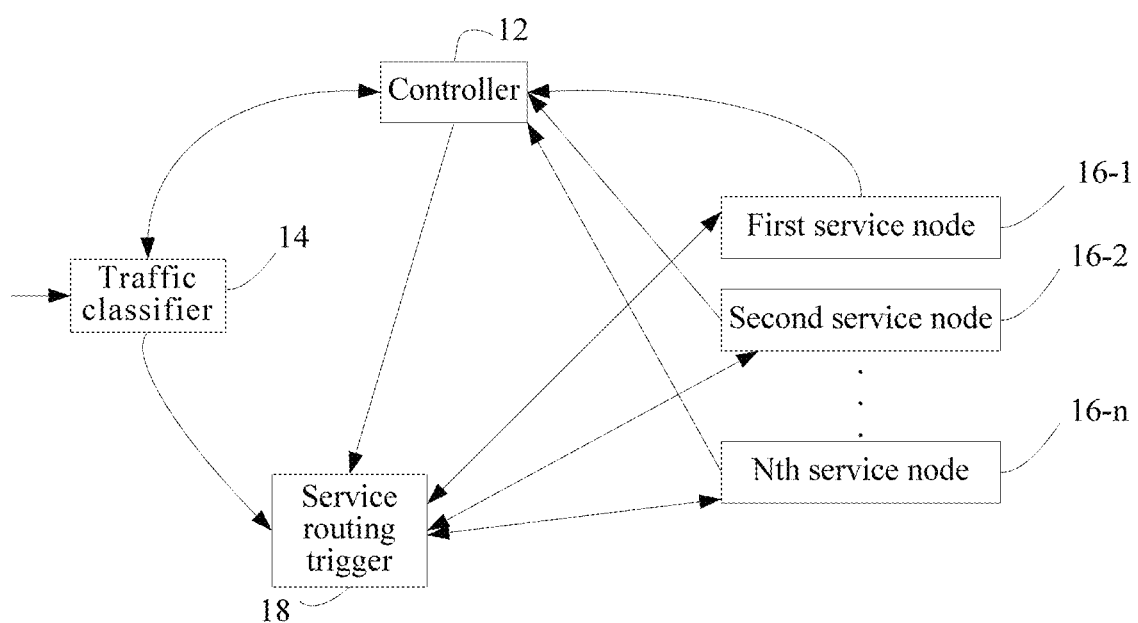
FIG. 1(a) and FIG. 1(b) are diagrams of a packet processing system according to Embodiment 1 of the present disclosure.
Figure 1B:
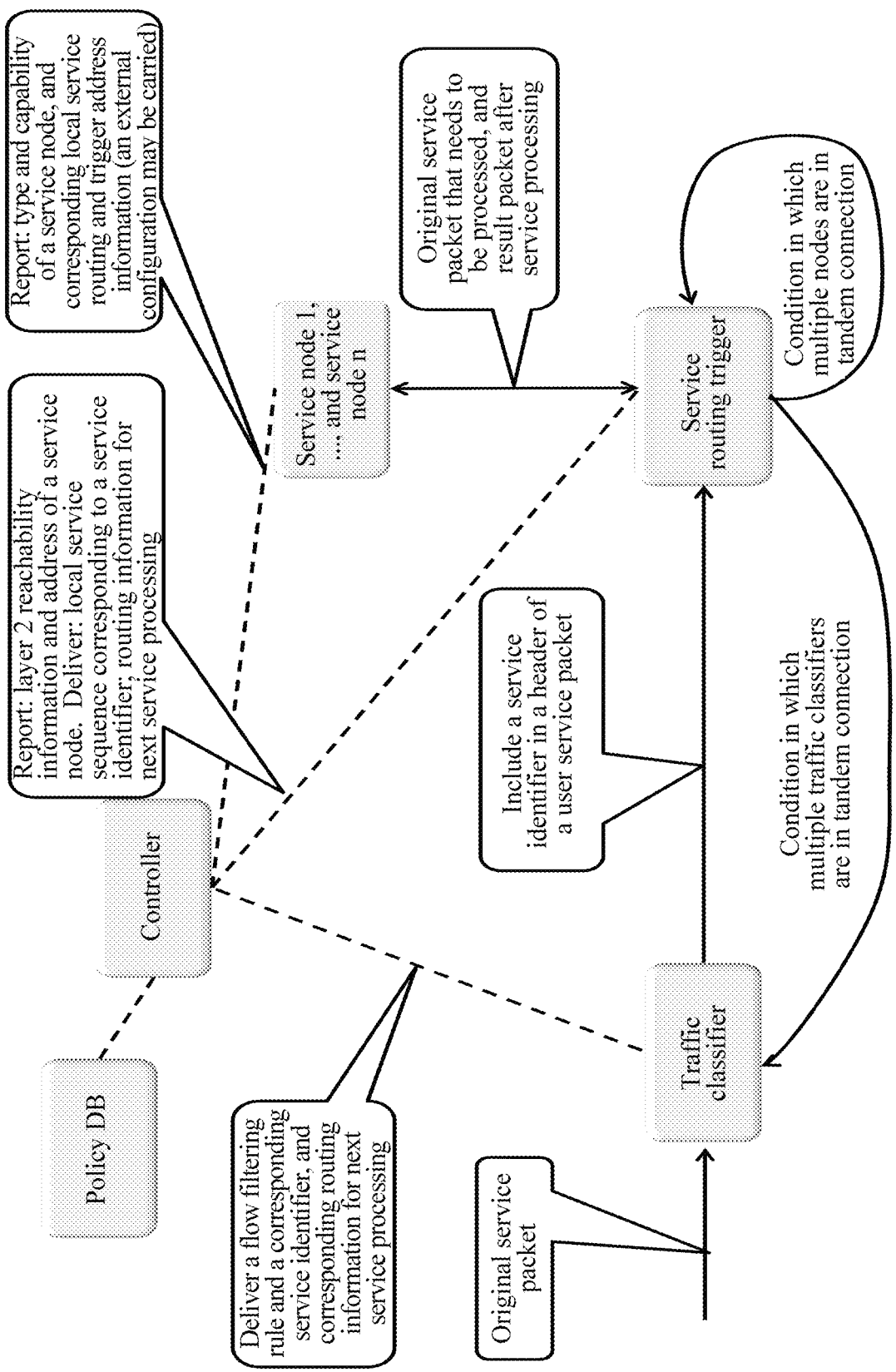

As shown in FIG. 1, a packet processing system includes a controller 12, a traffic classifier 14, and a service routing trigger 18.

The controller 12 is configured to send first policy information to the traffic classifier 14. The first policy information includes: a filtering rule, an address that matches the first filtering rule and is of a service routing trigger, and a service identifier corresponding to the filtering rule. The filtering rule is used to identify a packet, and the service identifier is used to represent a sequence of a service node that processes the packet.

The controller 12 is further configured to send second policy information to the service routing trigger 18, where the second policy information includes the service identifier, and a service node sequence that is corresponding to the service identifier.

The traffic classifier 14 is configured to receive the first policy information sent by the controller 12.

The traffic classifier 14 is further configured to: receive a first packet; determine, in the first policy information and according to a first filtering rule that matches the first packet, a first service identifier that matches the first filtering rule, and an address that matches the first filtering rule and is of the service routing trigger 18; and send a second packet to the service routing trigger 18, where the second packet includes the first service identifier.

The service routing trigger 18 is configured to: determine, in the second policy information and according to the first service identifier carried in the second packet, a first service node sequence that matches the first service identifier and processes the second packet; and successively trigger one or more service nodes in the first service node sequence to process the second packet.

Optionally, the second policy information may further include an address of a service node in the service node sequence corresponding to the service identifier.

Optionally, the second policy information may further include an address of a next-hop node of the service node sequence corresponding to the service identifier. Correspondingly, the service routing trigger 18 is configured to: determine, in the second policy information and according to the first service identifier carried in the second packet, an address of a next-hop node of the first service node sequence that matches the first service identifier; and forward, to the next-hop node of the first service node sequence, the second packet processed by a service node in the first service node sequence.

Specifically, when joining a network, multiple service nodes (16-1, 16-2, . . . , and 16-n) need to register with the controller 12 and report types and capabilities of the service nodes (16-1, 16-2, . . . , and 16-n). The service node may be an application in OSI layer 3 to layer 7, for example, a firewall, or an NAT (Network Address Translation) device; the service node may be a service node instance; or the service node may be a network device such as a router, a switch, or a server. Optionally, the service node may further report address information of a local service routing trigger 18 corresponding to the service node. An address that is corresponding to the service node and is of the service routing trigger 18 may be an Internet Protocol (IP) address or a media access control (MAC) address of the service routing trigger.

When joining the network, the traffic classifier 14 needs to register with the controller 12 and report an address of the traffic classifier 14, where the address of the traffic classifier 14 may be an IP address or a MAC address. Optionally, the traffic classifier 14 may be an application in OSI layer 3 to layer 7; the traffic classifier 14 may be an application instance; or the traffic classifier 14 may be a network device such as a router, a switch, or a server.

When joining the network, the service routing trigger 18 needs to register with the controller 12 and report service node information of the service routing trigger 18 and an address of the service routing trigger 18, where the address of the service routing trigger 18 may be an IP address or a MAC address. Optionally, the service routing trigger 18 may be an application in OSI layer 3 to layer 7; the service routing trigger 18 may be an application instance; or the service routing trigger 18 may be a network device such as a router, a switch, or a server. There may be one or multiple service routing triggers 18. When the packet processing system includes multiple service routing triggers, the multiple service routing triggers may be corresponding to one or multiple service node sequences, that is, each service routing trigger is corresponding to one service node sequence. Optionally, one service routing trigger may also be corresponding to multiple service node sequences or corresponding to all service node sequences.

Optionally, the controller 12 may be an application in OSI layer 3 to layer 7; or the controller 12 may be an application instance; or the controller 12 may be a network device such as a router, a switch, or a server. There may be one or multiple controllers 12.

Packets with a same service ID are processed by same one or more service nodes, and orders of the processing by the one or more service nodes are the same. Packets with different service IDs are processed by same one or more service nodes, and orders of the processing by the one or more service nodes are different; or packets with different service IDs are processed by different service nodes. For example, a packet whose service ID is 1 is first processed by a first service node 16-1, and then processed by a second service node 16-2; however, a packet whose service ID is 2 is first processed by the second service node 16-2, and then processed by the first service node 16-1. Optionally, if two different service IDs are allocated to two different packets in a same packet flow, it means that although service processing that needs to be performed on the two different packets is the same, for example, first processing by using a firewall and then processing by using a NAT device on both packets, the two packets are processed by different service nodes. In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device 1. Another service ID is allocated to packets, of which protocol numbers are less than or equal to 50, in the same packet flow, where the service ID is used to identify that the packets are first processed by a firewall 2 and then processed by a NAT device 2. This helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

Optionally, the first filtering rule may include one or multiple of a source address, a destination address, a source port, a destination port, and a protocol number that are of the first packet. For example, a first packet flow corresponding to the first packet may be identified by using 5-tuple information (a source address, a destination address, a source port, a destination port, and a protocol number) of the first packet. Optionally, the first filtering rule may be the 5-tuple information of the first packet, or may be a value calculated by using an algorithm according to the 5-tuple information of the first packet, for example, a value calculated by using a hash algorithm. When the traffic classifier 14 receives the first packet, if the filtering rule in the first policy information is 5-tuple information, the traffic classifier 14 acquires the 5-tuple information of the first packet from the first packet, so as to obtain the first filtering rule. If the filtering rule in the first policy information is a value obtained by means of processing based on the 5-tuple information by using a specific algorithm, the traffic classifier 14 acquires the 5-tuple information of the first packet from the first packet, and performs calculation by using the specific algorithm on the 5-tuple information of the first packet to obtain the value, where the obtained value is the first filtering rule.

The second packet is formed by adding the first service identifier to the first packet. For example, the second packet may be formed by adding the first service identifier to a header of the first packet, or may be formed by adding the first service identifier to a payload of the first packet.

By using an example in which the first packet is an Ethernet packet, the first service identifier may be added to a new header option of the first packet, or may be added to an IP header of the Ethernet packet; or an existing field in the header of the first packet may be reused, that is, a meaning of the existing field is changed to indicate that the first packet carries the first service identifier. For example, a VLAN identifier (also referred to as VLAN ID) of a virtual local area network (VLAN) or of a QINQ (IEEE 802.1Q in IEEE 802.1Q, also referred to as Stacked VLAN or Double VLAN), or a label (also referred to LABEL) in Multiprotocol Label Switching (MPLS) may be reused, or a part or all of a source MAC address may be escaped for reuse. A format of the new header option of the first packet is shown in Table 1: A type field is added between the source MAC address and the VLAN ID to indicate whether the first packet carries a service identifier and the first service identifier. For example, it may be defined as follows: When a type value is 0, it indicates that the first packet does not carry a service identifier, and in this case, a value of the service ID is 0; and when a type value is 1, it indicates that the first packet carries a service identifier, and in this case, the value of the service ID is the first service identifier carried in the first packet.

TABLE 1

| Destination MAC address | Source MAC address | Type | VLAN ID | ServiceID | IP packet |
| --- | --- | --- | --- | --- | --- |

The service routing trigger 18 receives the second packet, and determines, in the second policy information delivered by the controller 12 and according to the first service identifier, the first service node sequence that matches the first service identifier and processes the second packet. The service routing trigger 18 successively triggers and controls, according to an order of service nodes in the first service node sequence, all service nodes that start from the first service node 16-1 in the first service node sequence to process the second packet.

Optionally, the second policy information further includes an address of a service node in the first service node sequence.

Optionally, the second policy information further includes an address of a next-hop node of the service node sequence corresponding to the service identifier; then, the service routing trigger 18 determines, in the second policy information delivered by the controller 12 and according to the first service identifier, the address of the next-hop node of the first service node sequence, and sends, to the next-hop node of the first service node sequence, a second packet processed after the service routing trigger 18 controls all the service nodes in the first service node sequence to complete processing the second packet.

The first service node 16-1 is configured to receive and process the second packet sent by the service routing trigger 18. After completing processing the second packet, the first service node 16-1 sends the processed second packet to the service routing trigger 18; the service routing trigger 18 triggers, according to the order of service nodes in the first service node sequence, the second service node 16-2 after the first service node 16-1 to process the second packet; the service routing trigger 18 forwards the second packet to the next-hop node of the first service node sequence after a last service node 16-*n* in the first service node sequence completes processing the second packet.

Optionally, when triggering the first service node 16-1, the service routing trigger 18 may send together, to the first service node 16-1, addresses of service nodes after the first service node 16-1 in the first service node sequence and the address of the next-hop node of the first service node sequence; and instructs the first service node 16-1 to send the processed second packet to the second service node 16-2 in the first service node sequence. The second service node 16-2 receives the second packet that is processed and then sent by the first service node 16-1. After the second service node 16-2 processes the second packet, if it is determined that the second service node 16-2 is the last service node in the first service node sequence, the second service node 16-2 forwards the processed second packet to the next-hop node of the first service node sequence. Optionally, in the second policy information delivered by the controller 12, an address of the last service node in the service node sequence is set to a special address, for example, 0.0.0.0, where 0.0.0.0 is used to indicate that the service node is a last service node that processes the second packet, in the service node sequence. A special next-hop with the special address may be any unreachable address, as long as it can indicate that the service node is the last service node that processes the second packet, which is not limited in this embodiment of the present disclosure thereto.

Optionally, the first service nodes (16-1, 16-2, . . . , and 16-*n*) may be logical functional entities. It should be noted that a service node generally has a reachable address, where the address of the service node may be an IP address or a MAC address. Whether a first service node is a physical entity or a logical entity is not limited in this embodiment of the present disclosure, as long as the first service node has a reachable address. In addition, a service node providing a firewall function may be used as an example for illustration to help understand a service node instance. Generally, a firewall function may be installed on many servers, in this way, the servers on which a firewall function is installed can all provide service processing of the firewall function, and the servers on which a firewall function is installed have different addresses. In this way, each server on which a firewall function is installed may be called a service node, that is, each service node instance includes a reachable address and can independently process at least one type of service. In specific implementation of this embodiment of the present disclosure, the service routing trigger 18 selects service nodes that process the first packet and an order based on which the first packet is processed. If the first service node 16-1 has another backup node, the service routing trigger 18 may select, according to processing capabilities and service load conditions of the first service node 16-1 and the backup node of the first service node 16-1, an appropriate service node to process the packet.

Optionally, as shown in FIG. 2(*a*), when there is only one service routing trigger or only one service routing trigger group in the packet processing system, the service routing trigger or the service routing trigger group receives the second policy information delivered by the controller, where the second policy information includes all service identifiers (service identifier 1, service identifier 2, . . . , and service identifier n) and a service node sequence corresponding to each service identifier. Each service node sequence may include multiple same service nodes with different processing orders. For example, a service node sequence 1 corresponding to the service identifier 1 includes a first service node and a second service node, and an order based on which the service node sequence 1 processes a packet is that the packet is first processed by the first service node, and then forwarded to and processed by the second service node; a service node sequence 2 corresponding to the service identifier 2 includes a first service node and a second service node, and an order based on which the service node sequence 2 processes a packet is that the packet is first processed by the second service node, and then forwarded to and processed by the first service node. Each service node sequence may include different quantities of service nodes, for example, a service node sequence 3 corresponding to a service identifier 3 includes a first service node, a second service node, and a third service node.

When there is only one service routing trigger in the packet processing system, the traffic classifier adds the first service identifier of the first packet to the first packet, and then forwards the first packet to the service routing trigger; the service routing trigger searches the second policy information to acquire the first service node sequence corresponding to the first service identifier; and the service routing trigger successively triggers one or more service nodes in the first service node sequence to process the first packet.

When there is only one service routing trigger group that includes multiple service routing triggers in the packet processing system, the service routing trigger group has a virtual address. The traffic classifier adds the first service identifier of the first packet to the first packet, and then forwards the first packet to the virtual address of service routing trigger group; a service routing trigger specified according to load balancing and the like in the service routing trigger group searches the second policy information to acquire the first service node sequence corresponding to the first service identifier; and the service routing trigger successively triggers one or more service nodes in the first service node sequence to process the first packet.

Optionally, as shown in FIG. 2(*b*), when there are multiple service routing triggers in the packet processing system, and each service routing trigger is corresponding to one service identifier, the service routing trigger receives the second policy information delivered by the controller, where the second policy information includes a service identifier (for example, the service identifier 1) and a service node sequence corresponding to the service identifier.

Optionally, the first policy information may further include a tenant identifier, and the service identifier is corresponding to the filtering rule and the tenant identifier. Correspondingly, the traffic classifier 14 is specifically configured to: determine, in the first policy information and according to a first tenant identifier corresponding to the first filtering rule and the first packet, the first service identifier that matches the first filtering rule and the first tenant identifier, and an address, which matches the first filtering rule, of the first service routing trigger; and send the second packet to the service routing trigger 18.

Optionally, as shown in FIG. 2(*c*), when the packet processing system is applied in a multi-tenant service scenario, the first policy information includes a service identifier, a tenant identifier, a service node sequence corresponding to the service identifier and the tenant identifier, and an address that is corresponding to the service identifier and the tenant identifier and is of a service routing trigger. Correspondingly, the traffic classifier is specifically configured to: determine, in the first policy information and according to a first tenant identifier corresponding to the first filtering rule and the first packet, the first service identifier that matches the first filtering rule and the first tenant identifier, and an address that matches the first filtering rule and is of the first service routing trigger; and send the second packet to the first service routing trigger.

According to the packet processing system provided in this embodiment of the present disclosure, a controller sends first policy information to a traffic classifier and sends second policy information to a service routing trigger, and the traffic classifier and the service routing trigger process packets according to received policy information, which implements unified management of the traffic classifier and the service routing trigger by the controller. Further, the traffic classifier adds, according to the first policy information, a service identifier to a packet that is identified as a packet on which service processing needs to be performed, and sends, to the service routing trigger, the packet to which the service identifier is added; and the service routing trigger controls and triggers a service node in a service node sequence corresponding to the service identifier to process the packet, and normally forwards a processed packet according to a routing table, which implements service processing on the packet. In addition, a service node only needs to perform service processing on a packet according to control and triggering of the service routing trigger, and therefore, a mechanism in the present disclosure is compatible with service nodes with various different service capabilities.

Embodiment 2

A packet processing system may also include multiple service routing triggers. In this case, a packet processing system includes a controller, a traffic classifier, a first service routing trigger, and a second service routing trigger.

The controller is configured to send first policy information to the traffic classifier, where the first policy information includes: a filtering rule, an address that is corresponding to the filtering rule and is of a service routing trigger, and a service identifier corresponding to the filtering rule, where the filtering rule is used to identify a packet, and the service identifier is used to represent a sequence of a service node that processes the packet.

The controller is further configured to send second policy information to the first service routing trigger, where the second policy information includes: the service identifier, and a part, which is triggered by the first service routing trigger, of a service node sequence corresponding to the service identifier.

The controller is further configured to send third policy information to the second service routing trigger, where the third policy information includes: the service identifier, and a part that is triggered by the second service routing trigger and is of the service node sequence corresponding to the service identifier.

The traffic classifier is configured to receive the first policy information sent by the controller.

The traffic classifier is further configured to: receive a first packet; determine, in the first policy information and according to a first filtering rule that matches the first packet, a first service identifier that matches the first filtering rule, an address that matches the first filtering rule and is of the first service routing trigger, and an address that matches the first filtering rule and is of the second service routing trigger; and send a second packet to the first service routing trigger, where the second packet includes the first service identifier.

The first service routing trigger is configured to: determine, in the second policy information and according to the first service identifier carried in the second packet, a first service node sequence that matches the first service identifier; and send, to the second service routing trigger, a second packet processed after successively triggering one or more service nodes in the first service node sequence to process the second packet.

The second service routing trigger is configured to: determine, in the third policy information and according to the first service identifier carried in the processed second packet, a second service node sequence that matches the first service identifier; and successively trigger one or more service nodes in the second service node sequence to process the second packet.

Optionally, the first policy information may further include a tenant identifier, and the service identifier is corresponding to the filtering rule and the tenant identifier.

Optionally, the traffic classifier is specifically configured to: determine, in the first policy information and according to a first tenant identifier corresponding to the first filtering rule and the first packet, the first service identifier that matches the first filtering rule and the first tenant identifier, and the address that matches the first filtering rule and is of the first service routing trigger; and send the second packet to the first service routing trigger.

Optionally, the second policy information may further include an address of a next-hop node of the service node sequence corresponding to the service identifier.

According to the packet processing system provided in this embodiment of the present disclosure, a controller sends first policy information to a traffic classifier and sends second policy information to a service routing trigger, and the traffic classifier and the service routing trigger process packets according to received policy information, which implements unified management of the traffic classifier and the service routing trigger by the controller. Further, the traffic classifier adds, according to the first policy information, a service identifier to a packet that is identified as a packet on which service processing needs to be performed, and sends, to the service routing trigger, the packet to which the service identifier is added; and the service routing trigger controls and triggers a service node in a service node sequence corresponding to the service identifier to process the packet, and normally forwards a processed packet according to a routing table, which implements service processing on the packet. In addition, a service node only needs to perform service processing on a packet according to control and triggering of the service routing trigger, and therefore, a mechanism in the present disclosure is compatible with service nodes with various different service capabilities.

Embodiment 3

Figure 3:
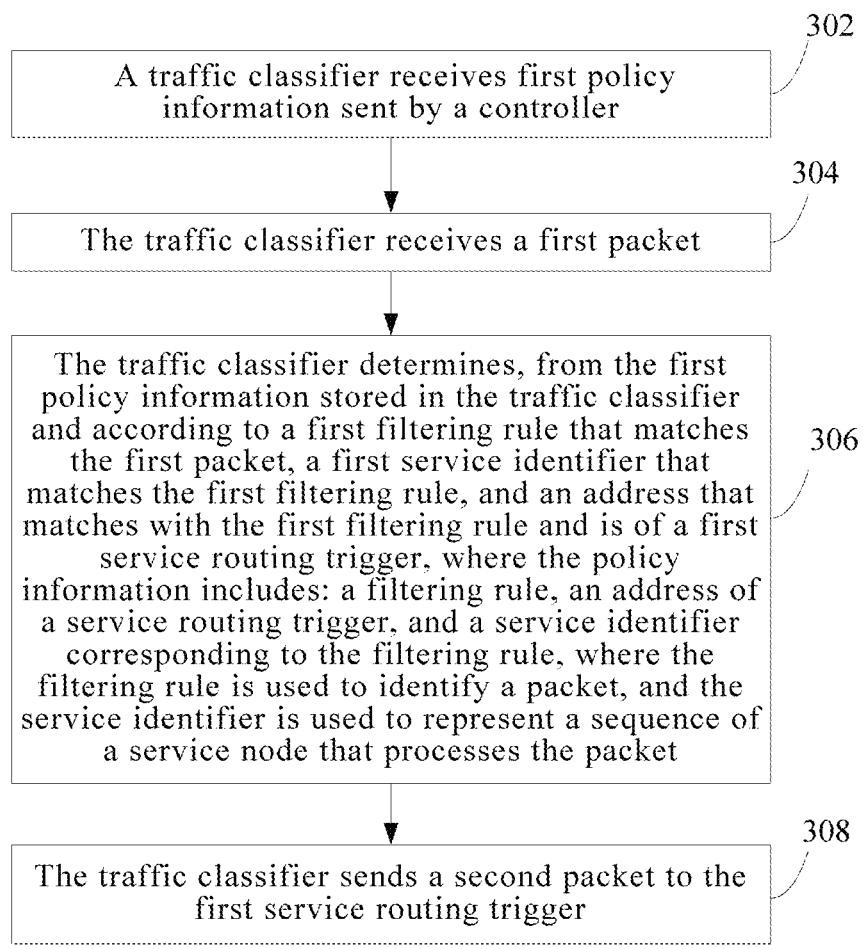
FIG. 3 is a schematic diagram of a packet processing method according to Embodiment 3 of the present disclosure.

As shown in FIG. 3, this embodiment of the present disclosure provides a packet processing method, where the method includes the following steps:

304. A traffic classifier receives a first packet.

The first packet may be an IP packet or an Ethernet packet, and the first packet may be sent from a user-side device, or may be sent from a network-side device, which is not limited in this embodiment of the present disclosure.

306. The traffic classifier determines, in policy information stored in the traffic classifier and according to a first filtering rule that matches the first packet, a first service identifier that matches the first filtering rule, and an address that matches the first filtering rule and of a first service routing trigger, where the policy information includes: a filtering rule, an address of a service routing trigger, and a service identifier corresponding to the filtering rule, where the filtering rule is used to identify a packet, and the service identifier is used to represent a sequence of a service node that processes the packet.

The first filtering rule may include one or multiple of: a source address, a destination address, a source port, a destination port, and a protocol number that are of the first packet. For example, a first packet flow corresponding to the first packet may be identified by using 5-tuple information (a source address, a destination address, a source port, a destination port, and a protocol number) of the first packet. Optionally, the first filtering rule may be the 5-tuple information of the first packet, or may be a value calculated by using an algorithm according to the 5-tuple information of the first packet, for example, a value calculated by using a hash algorithm. When the traffic classifier receives the first packet, if the filtering rule in the policy information is 5-tuple information, the traffic classifier acquires the 5-tuple information from the first packet, so as to obtain the first filtering rule. If the filtering rule in the policy information is a value obtained by means of processing based on the 5-tuple information by using a specific algorithm, the traffic classifier acquires the 5-tuple information of the first packet from the first packet, and performs calculation by using the specific algorithm on the 5-tuple information of the first packet to obtain the value, where the obtained value is the first filtering rule.

308. The traffic classifier sends a second packet to the first service routing trigger, so that the first service routing trigger determines, in second policy information and according to the first service identifier carried in the second packet, a first service node sequence that matches the first service identifier and processes the second packet, and successively triggers one or more service nodes in the first service node sequence to process the second packet, where the second packet is formed by adding the first service identifier to the first packet.

For example, the second packet may be formed by adding the first service identifier to a header of the first packet, or may be formed by adding the first service identifier to a payload of the first packet.

By using an example in which the first packet is an Ethernet packet, the first service identifier may be added to a new header option of the first packet, or may be added to an IP header of the Ethernet packet; or an existing field in the header of the first packet may be reused, that is, a meaning of the existing field is changed to indicate that the first packet carries the first service identifier. For example, a VLAN identifier (also referred to as VLAN ID) of a virtual local area network (VLAN for short) or of a QINQ (IEEE 802.1Q in IEEE 802.1Q, also referred to as Stacked VLAN or Double VLAN), or a label (also referred to as LABEL) in Multiprotocol Label Switching (MPLS) may be reused, or a part or all of a source MAC address may be escaped for reuse. A format of the new header option of the first packet is shown in Table 1: A type field is added between the source MAC address and the VLAN ID to indicate whether the first packet carries a service identifier and the first service identifier. For example, it may be defined as follows: When a type value is 0, it indicates that the first packet does not carry a service identifier, and in this case, a value of the service ID is 0; and when a type value is 1, it indicates that the first packet carries a service identifier, and in this case, the value of the service ID is the first service identifier carried in the first packet.

Optionally, before the receiving a first packet, the packet processing method further includes the following step: 302. The traffic classifier receives first policy information sent by a controller.

Packets with a same service identifier (ID) are processed by a same service node, and an order of the processing by the service node is the same. Packets with different service IDs are processed by a same service node, and an order of the processing by the service node is different; or packets with different service IDs are processed by different service nodes. Further, in specific implementation of this embodiment of the present disclosure, if two different service IDs are allocated to two different packets in a same packet flow, it means that although service processing that needs to be performed on the two different packets is the same, the packet flow is processed by different service nodes. In this way, load balancing may be implemented for packet processing. For example, the two different packets are first processed by a firewall, and then processed by a NAT device, but are processed by different service nodes. In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall 2 and then processed by a NAT device 2. In this way, it helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

Optionally, the first policy information may further include a tenant identifier, and the service identifier is corresponding to the filtering rule and the tenant identifier. The step that the traffic classifier determines the first service identifier is specifically that: the traffic classifier determines, in the policy information and according to a first tenant identifier corresponding to the first filtering rule and the first packet, the first service identifier that matches the first filtering rule and the first tenant identifier, and the address of the first service routing trigger.

Optionally, when the packet processing method is applied in a scenario with a multi-tenant service, the policy information includes a service identifier, a tenant identifier, a service node sequence corresponding to the service identifier and the tenant identifier, and an address that is corresponding to the service identifier and the tenant identifier and is of a service routing trigger.

According to the packet processing method provided in this embodiment of the present disclosure, a traffic classifier receives policy information sent by a controller; the traffic classifier adds a service identifier to a classified packet on which service processing needs to be performed, and sends, to a service routing trigger, the packet that carries the service identifier; the service routing trigger controls and triggers a service node to process the packet; and after processing the packet to which the service identifier is added, the service node may forward a processed packet to a next service node under control of the service routing trigger or normally forward the processed packet according to a routing table, which implements service processing on a packet flow. In addition, a service node only needs to perform service processing on a packet according to control and triggering of the service routing trigger, and therefore, a mechanism in the present disclosure is compatible with service nodes with various different service capabilities.

Embodiment 4

Figure 4:
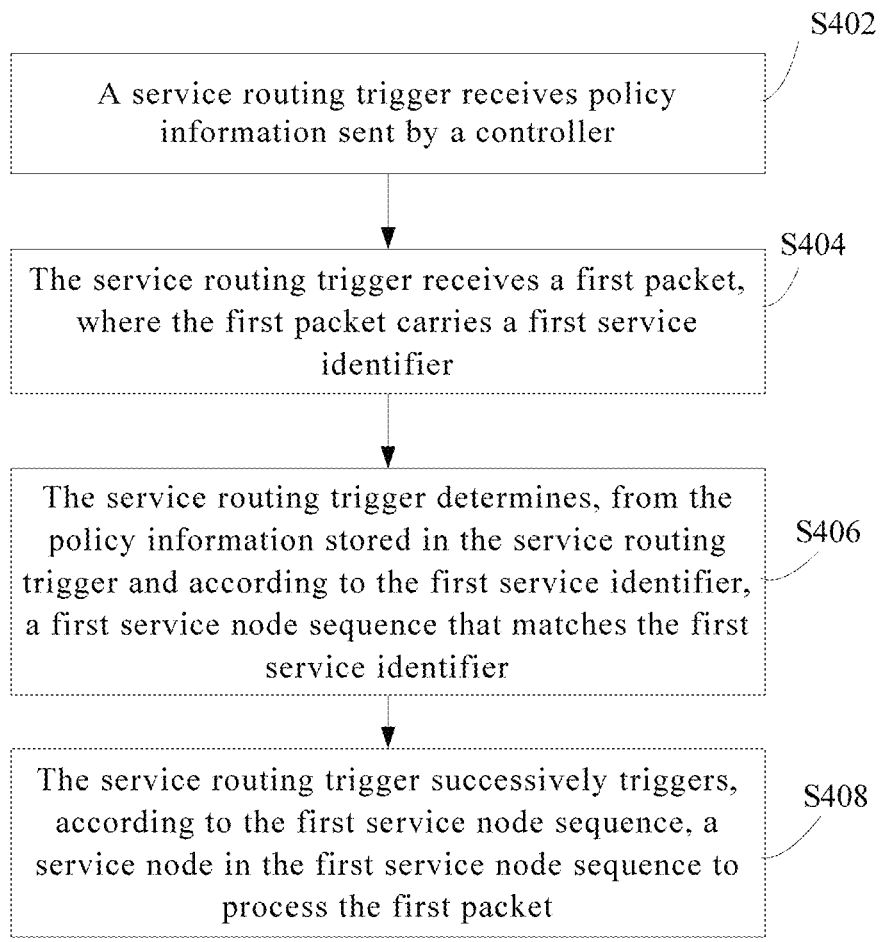
FIG. 4 is a flowchart of a packet processing method according to Embodiment 4 of the present disclosure.

As shown in FIG. 4, this embodiment of the present disclosure provides a packet processing method, where the method includes the following steps:

S404. A service routing trigger receives a first packet, where the first packet carries a first service identifier.

S406. The service routing trigger determines, in policy information stored in the service routing trigger and according to the first service identifier, a first service node sequence that matches the first service identifier.

S408. The service routing trigger successively triggers, according to the first service node sequence, one or more service nodes in the first service node sequence to process the first packet.

Optionally, before the service routing trigger receives the first packet sent by a traffic classifier, the method further includes the following step:

S402. The service routing trigger receives the policy information sent by a controller.

Optionally, the policy information includes a service identifier and a service node sequence that matches the service identifier and processes a packet, and the service identifier is used to represent a sequence of a service node that processes a packet.

Optionally, the policy information may further include an address of a service node in the service node sequence corresponding to the service identifier.

Optionally, the policy information may further include an address of a next-hop node of the service node sequence corresponding to the service identifier. Correspondingly, the method may further include the following step: The service routing trigger receives the second packet that is sent by the traffic classifier after having been processed by a last service node in the first service node sequence; and sends the processed second packet to a next-hop node of the service node sequence.

Packets with a same service ID are processed by a same service node, and an order of the processing by the service node is the same. Packets with different service IDs are processed by a same service node, and an order of the processing by the service node is different; or packets with different service IDs are processed by different service nodes. For example, a packet whose service ID is 1 is first processed by a first service node 26-1, and then processed by a second service node instance 28; however, a packet whose service ID is 2 is first processed by the second service node instance 28, and then processed by the first service node 26-1. Optionally, if two different service IDs are allocated to two different packets in a same packet flow, it means that although service processing that needs to be performed on the two different packets is the same, for example, first processing by using a firewall and then processing by using a NAT device on both packets, the two packets are processed by different service nodes. In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall 1 and then processed by a NAT device 1. Another service ID is allocated to packets, of which protocol numbers are less than or equal to 50, in the same packet flow, where the service ID is used to identify that the packets are first processed by a firewall 2 and then processed by a NAT device 2. In this way, it helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

A service node may be a logical functional entity. It should be noted that a service node generally has a reachable address, where the address of the service node may be an IP address or a MAC address. Whether a service node is a physical entity or a logical entity is not limited in this embodiment of the present disclosure, as long as the service node has a reachable address. In addition, a service node instance providing a firewall function may be used as an example for illustration to help understand the service node instance. Generally, a firewall function may be installed on many servers. In this way, servers on which a firewall function is installed can provide service processing of the firewall function, and multiple servers on which a firewall function is installed have different addresses. In this way, each server on which a firewall function is installed may be called a service node instance, that is, each service node instance has a reachable address and can independently process at least one service. In specific implementation of this embodiment of the present disclosure, the service routing trigger determines to select service nodes that process the packet and an order based on which the packet is processed. For example, the service routing trigger may select, according to processing capabilities and service load conditions of service node instances, an appropriate service node instance to process the packet.

According to the packet processing method provided in this embodiment of the present disclosure, a service routing trigger receives a first packet that carries a first service identifier, and acquires, according to the first service identifier and policy information that is stored in the service routing trigger, a first service node sequence that matches the first service identifier and processes the first packet, an address of a first service node in the first service node sequence, and an address of a next-hop node of the first service node sequence, which implements service processing on a packet flow.

Embodiment 5

A packet processing method includes:

receiving, by a first service routing trigger, a first packet, where the first packet carries a first service identifier;

determining, by the first service routing trigger, in first policy information stored in the first service routing trigger and according to the first service identifier, a first service node sequence that matches the first service identifier, and an address of a second service routing trigger;

forwarding, by the first service routing trigger, the first packet to the second service routing trigger after successively triggering, according to the first service node sequence, one or more service nodes in the first service node sequence to process the first packet;

determining, by the second service routing trigger, in second policy information stored in the second service routing trigger and according to the first service identifier, a second service node sequence that matches the first service identifier; and successively triggering, by the second service routing trigger, according to the second service node sequence, one or more service nodes in the second service node sequence to process the first packet.

Optionally, before the receiving, by the first service routing trigger and the second service routing trigger, the first packets, the method further includes: receiving, by the first service routing trigger, the first policy information sent by a controller, and receiving, by the second service routing trigger, the second policy information sent by the controller.

According to the packet processing method provided in this embodiment of the present disclosure, a service routing trigger receives a first packet that carries a first service identifier, and acquires, according to the first service identifier and policy information that is stored in the service routing trigger, a first service node sequence that matches the first service identifier and processes the first packet, an address of a first service node in the first service node sequence, and an address of a next-hop node of the first service node sequence, which implements service processing on a packet flow.

Embodiment 6

Figure 5:
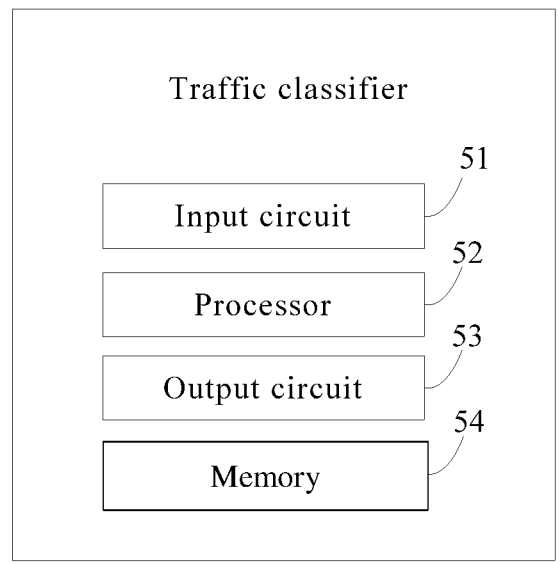
FIG. 5 is a schematic structural diagram of a traffic classifier according to Embodiment 6 of the present disclosure.

This embodiment of the present disclosure provides a traffic classifier. As shown in FIG. 5, FIG. 5 is a schematic diagram of an apparatus of a traffic classifier according to this embodiment of the present disclosure.

The traffic classifier includes an input circuit 51, a processor 52, an output circuit 53, and a memory 54.

The input circuit 51 is configured to receive a first packet.

The first packet may be an IP packet or an Ethernet packet, and the first packet may be sent from a user-side device, or may be sent from a network-side device, which is not limited in this embodiment of the present disclosure.

The processor 52 is configured to: determine in policy information stored in the memory 54 and according to a first filtering rule that matches the first packet, a first service identifier that matches the first filtering rule, and an address that matches the first filtering rule, of a first service routing trigger; and trigger the output circuit 53 to send a second packet to the first service routing trigger, where the second packet is formed by adding the first service identifier to the first packet.

The first filtering rule may include one or multiple of: a source address, a destination address, a source port, a destination port, and a protocol number that are of the first packet. For example, a first packet flow corresponding to the first packet may be identified by using 5-tuple information (a source address, a destination address, a source port, a destination port, and a protocol number) of the first packet. Optionally, the first filtering rule may be the 5-tuple information of the first packet, or may be a value calculated by using an algorithm according to the 5-tuple information of the first packet, for example, a value calculated by using a hash algorithm. When the input circuit 51 receives the first packet, if a filtering rule in the policy information is 5-tuple information, the processor 52 acquires the 5-tuple information from the first packet, so as to obtain the first filtering rule. If the filtering rule in the policy information is a value obtained by using a specific algorithm based on the 5-tuple information, the processor 52 acquires the 5-tuple information of the first packet from the first packet, and performs calculation by using the specific algorithm on the 5-tuple information of the first packet to obtain the value, where the obtained value is the first filtering rule.

The output circuit 53 is configured to send the second packet to the first service routing trigger, so that the first service routing trigger determines, in second policy information and according to the first service identifier carried in the second packet, a first service node sequence that matches the first service identifier and processes the second packet, and successively triggers one or more service nodes in the first service node sequence to process the second packet.

The memory 54 is configured to store the policy information.

The second packet is formed by adding the first service identifier to the first packet. For example, the second packet may be formed by adding the first service identifier to a header of the first packet, or may be formed by adding the first service identifier to a payload of the first packet.

By using an example in which the first packet is an Ethernet packet, the first service identifier may be added to a new header option of the first packet, or may be added to an IP header of the Ethernet packet; or an existing field in the header of the first packet may be reused, that is, a meaning of the existing field is changed to indicate that the first packet carries the first service identifier. For example, a VLAN identifier (also referred to as VLAN ID) of a virtual local area network (VLAN) or of a QINQ (IEEE 802.1Q in IEEE 802.1Q, also referred to as Stacked VLAN or Double VLAN), or a label (also referred to as LABEL) in Multi-protocol Label Switching (MPLS) may be reused, or a part or all of a source MAC address may be escaped for reuse. A format of the new header option of the first packet is shown in Table 1: A type field is added between the source MAC address and the VLAN ID to indicate whether the first packet carries a service identifier and the first service identifier. For example, it may be defined as follows: When a type value is 0, it indicates that the first packet does not carry a service identifier, and in this case, a value of the service ID is 0; and when a type value is 1, it indicates that the first packet carries a service identifier, and in this case, the value of the service ID is the first service identifier carried in the first packet.

Optionally, the input circuit 51 is further configured to receive first policy information sent by a controller, where the first policy information includes: a filtering rule, an address of a service routing trigger, and a service identifier corresponding to the filtering rule, where the filtering rule is used to identify a packet, and the service identifier is used to identify a sequence of a service node that processes the packet.

Optionally, the first policy information may further include a tenant identifier, and the service identifier is corresponding to the filtering rule and the tenant identifier. Correspondingly, the processor 52 is specifically configured to: determine, in the first policy information and according to a first tenant identifier corresponding to the first filtering rule and the first packet, the first service identifier that matches the first filtering rule and the first tenant identifier, and an address that matches the first filtering rule and the first tenant identifier and is of the first service routing trigger; and trigger the output circuit 53 to send the second packet to the first service routing trigger.

Optionally, the controller may allocate a service processing policy based on a packet flow. The controller delivers the first policy information to the traffic classifier according to a service processing policy corresponding to a packet flow. The first policy information includes: a filtering rule, an address of a service routing trigger, and a service identifier corresponding to the filtering rule, where the filtering rule is used to identify a packet, and the service identifier is used to identify a sequence of a service node that processes the packet. Packets with a same service identifier (ID) are processed by a same service node, and an order of the processing by the service node is the same. Packets with different service IDs are processed by a same service node, and an order of the processing by the service node is different; or packets with different service IDs are processed by different service nodes. Further, in specific implementation of this embodiment of the present disclosure, if two different service IDs are allocated to two different packets in a same packet flow, it means that although service processing that needs to be performed on the two different packets is the same, the packet flow is processed by different service node or service node instances. In this way, load balancing may be implemented for packet processing. For example, the two different packets are first processed by a firewall, and then processed by a NAT device, but are processed by different service nodes. In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall 1 and then processed by a NAT device 1. Another service ID is allocated to packets, of which protocol numbers are less than or equal to 50, in the same packet flow, where the service ID is used to identify that the packets are first processed by a firewall 2 and then processed by a NAT device 2. In this way, it helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

According to the traffic classifier provided in this embodiment of the present disclosure, a service identifier is added to a received packet according to policy information, so that a service routing trigger controls and triggers, according to the service identifier, a service node in a service node sequence corresponding to the service identifier to process the packet to which the service identifier is added, which implements service processing on the packet.

Embodiment 7

Figure 6:
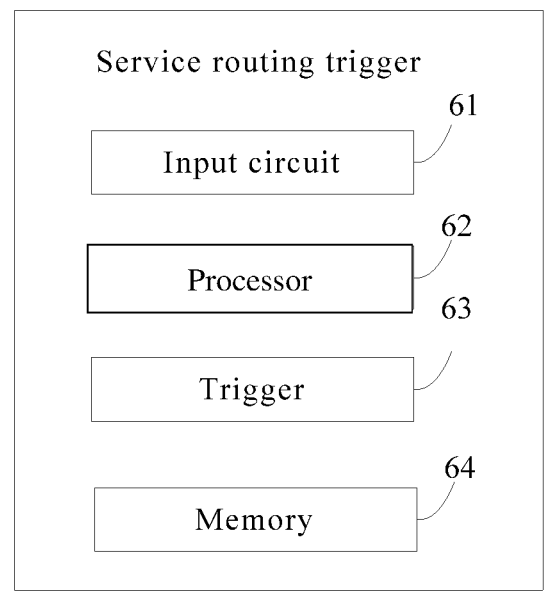
FIG. 6 is a schematic structural diagram of a service routing trigger according to Embodiment 7 of the present disclosure.

As shown in FIG. 6, this embodiment of the present disclosure provides a service routing trigger, including an input circuit 61, a processor 62, and a trigger 63.

The input circuit 61 is configured to receive a first packet, where the first packet carries a first service identifier.

For example, the first service identifier that matches the first packet may be carried in a header of the first packet, or the first service identifier may be carried in a payload of the first packet.

By using an example in which the first packet is an Ethernet packet, the first service identifier may be added to a new header option of the first packet, or may be added to an IP header of the Ethernet packet; or an existing field in the header of the first packet may be reused, that is, a meaning of the existing field is changed to indicate that the first packet carries the first service identifier. For example, a VLAN identifier (also referred to as VLAN ID) of a virtual local area network (VLAN) or of a QINQ (IEEE 802.1Q in IEEE 802.1Q, also referred to as Stacked VLAN or Double VLAN), or a label (also referred to as LABEL) in Multi-protocol Label Switching (MPLS) may be reused, or a part or all of a source MAC address may be escaped for reuse. A format of the new header option of the first packet is shown in Table 1: A type field is added between the source MAC address and the VLAN ID to indicate whether the first packet carries a service identifier and the first service identifier. For example, it may be defined as follows: When a type value is 0, it indicates that the first packet does not carry a service identifier, and in this case, a value of the service ID is 0; and when a type value is 1, it indicates that the first packet carries a service identifier, and in this case, the value of the service ID is the first service identifier carried in the first packet.

The processor 62 is configured to determine, in policy information stored in the service routing trigger and according to the first service identifier, a first service node sequence that matches the first service identifier, and an address of a service node in the first service node sequence.

The triggering unit 63 is configured to successively trigger, according to the first service node sequence, one or more service nodes in the first service node sequence to process the first packet.

Optionally, the service routing trigger may further include a memory 64, where the memory 64 is configured to store the policy information.

Optionally, the input circuit 61 is configured to receive the policy information sent by a controller.

Optionally, the policy information may include: a service identifier, a service node sequence that matches the service identifier and processes a packet, and an address of a service node in the service node sequence, and the service identifier is used to represent a sequence of a service node that processes the packet.

Optionally, the policy information further includes an address of a next-hop node of the service node sequence.

In specific implementation of this embodiment of the present disclosure, the controller may allocate a service processing policy based on a packet flow. The controller delivers policy information to a service node instance (or a service node) according to a service processing policy corresponding to a packet flow. Packets with a same service ID are processed by a same service node instance (or a service node), and an order of the processing by the service node instance (or a service node) is the same. For example, a packet whose service ID=1 is first processed by a first service node 16, and then processed by a second service node 18; however, a packet whose service ID=2 is first processed by the second service node 18, and then processed by the first service node 16. Optionally, if two different service IDs are allocated to two different packets in a same packet flow, it means that although service processing that needs to be performed on the two different packets is the same, for example, first processing by using a firewall and then processing by using an NAT device on both packets, the two packets are processed by different service nodes (or service node instances). In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

A first service node may be a logical functional entity. It should be noted that a service node instance generally has a reachable address, for example, a reachable IP address or MAC address. In this way, whether a first service node is a physical entity or a logical entity is not limited in this embodiment of the present disclosure, as long as the first service node has a reachable address. In addition, a service node instance providing a firewall function may be used as an example for illustration to help understand the service node instance. Generally, a firewall function may be installed on many servers, for example, a virtual machine VM. In this way, servers on which a firewall function is installed can all provide service processing of the firewall function, and the servers on which a firewall function is installed have different addresses. In this way, each server on which a firewall function is installed may be called a service node instance, that is, each service node instance includes a reachable address and can independently process at least one service. In specific implementation of this embodiment of the present disclosure, the controller determines to select the first service node to process the packet flow. For example, the controller may select, according to processing capabilities and service load conditions of service node instances, an appropriate service node instance to process the packet flow.

Optionally, the trigger 63 is further configured to send, to the controller, a packet for requesting to acquire the policy information. Correspondingly, the input circuit 61 is further configured to receive the policy information sent by the controller according to a packet, sent by the trigger 63, for requesting to acquire the policy information.

According to the service routing trigger provided in this embodiment of the present disclosure, a packet that carries a service identifier is received, and a service node in a service node sequence corresponding to the service identifier is controlled and triggered to process the packet, which implements service processing on a packet flow.

Embodiment 8

Figure 7:
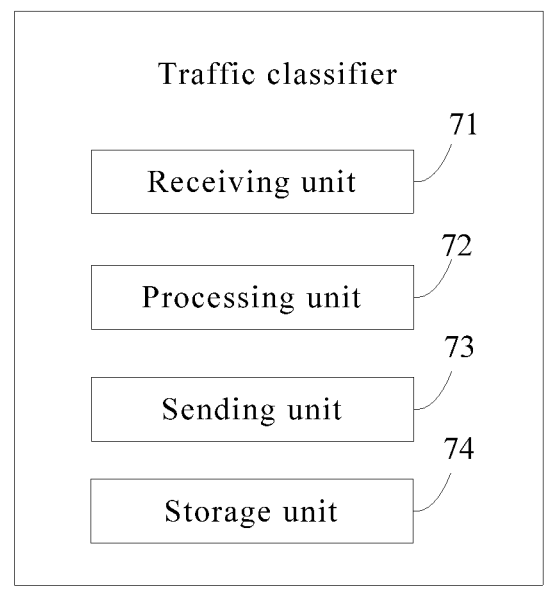
FIG. 7 is a schematic structural diagram of a traffic classifier according to Embodiment 8 of the present disclosure.

As shown in FIG. 7, this embodiment of the present disclosure provides a traffic classifier, including a receiving unit 71, a processing unit 72, a sending unit 73, and a storage unit 74.

The receiving unit 71 is configured to receive a first packet.

The first packet may be an IP packet or an Ethernet packet, and the first packet may be sent from a user-side device, or may be sent from a network-side device, which is not limited in this embodiment of the present disclosure.

The processing unit 72 is configured to: determine in policy information stored in the storage unit 74 and according to a first filtering rule that matches the first packet, a first service identifier that matches the first filtering rule, and an address that matches the first filtering rule and is of a first service routing trigger; and trigger the sending unit 73 to send a second packet to the first service routing trigger, where the second packet is formed by adding the first service identifier to the first packet.

The first filtering rule may include one or multiple of: a source address, a destination address, a source port, a destination port, and a protocol number that are of the first packet. For example, a first packet flow corresponding to the first packet may be identified by using 5-tuple information (a source address, a destination address, a source port, a destination port, and a protocol number) of the first packet. Optionally, the first filtering rule may be the 5-tuple information of the first packet, or may be a value calculated by using an algorithm according to the 5-tuple information of the first packet, for example, a value calculated by using a hash algorithm. When the receiving unit 71 receives the first packet, if a filtering rule in the policy information is 5-tuple information, the processing unit 72 acquires the 5-tuple information from the first packet, so as to obtain the first filtering rule. If the filtering rule in the policy information is a value obtained by using a specific algorithm based on the 5-tuple information, the processing unit 72 acquires the 5-tuple information of the first packet from the first packet, and performs calculation by using the specific algorithm on the 5-tuple information of the first packet to obtain the value, where the obtained value is the first filtering rule.

The sending unit 73 is configured to send the second packet to the first service routing trigger, so that the first service routing trigger determines, in second policy information and according to the first service identifier carried in the second packet, a first service node sequence that matches the first service identifier and processes the second packet, and successively triggers one or more service nodes in the first service node sequence to process the second packet.

The storage unit 74 is configured to store the policy information.

The second packet is formed by adding the first service identifier to the first packet. For example, the second packet may be formed by adding the first service identifier to a header of the first packet, or may be formed by adding the first service identifier to a payload of the first packet.

By using an example in which the first packet is an Ethernet packet, the first service identifier may be added to a new header option of the first packet, or may be added to an IP header of the Ethernet packet; or an existing field in the header of the first packet may be reused, that is, a meaning of the existing field is changed to indicate that the first packet carries the first service identifier. For example, a VLAN identifier (also referred to as VLAN ID) of a virtual local area network (VLAN) or of a QINQ (IEEE 802.1Q in IEEE 802.1Q, also referred to as Stacked VLAN or Double VLAN), or a label (also referred to as LABEL) in Multiprotocol Label Switching (MPLS) may be reused, or a part or all of a source MAC address may be escaped for reuse. A format of the new header option of the first packet is shown in Table 1: A type field is added between the source MAC address and the VLAN ID to indicate whether the first packet carries a service identifier and the first service identifier. For example, it may be defined as follows: When a type value is 0, it indicates that the first packet does not carry a service identifier, and in this case, a value of the service ID is 0; and when a type value is 1, it indicates that the first packet carries a service identifier, and in this case, the value of the service ID is the first service identifier carried in the first packet.

Optionally, the receiving unit 71 is further configured to receive first policy information sent by a controller.

Optionally, the first policy information includes: a filtering rule, an address of a service routing trigger, and a service identifier corresponding to the filtering rule, where the filtering rule is used to identify a packet, and the service identifier is used to identify a sequence of a service node that processes the packet.

Optionally, the first policy information may further include a tenant identifier, and the service identifier is corresponding to the filtering rule and the tenant identifier. Correspondingly, the processing unit 72 is specifically configured to: determine, in the first policy information and according to a first tenant identifier corresponding to the first filtering rule and the first packet, the first service identifier that matches the first filtering rule and the first tenant identifier, and an address, that matches the first filtering rule and the first tenant identifier and is of the first service routing trigger; and trigger the sending unit 73 to send the second packet to the first service routing trigger.

Optionally, the controller may allocate a service processing policy based on a packet flow. The controller delivers the first policy information to the traffic classifier according to a service processing policy corresponding to a packet flow. The first policy information includes: a filtering rule, an address of a service routing trigger, and a service identifier corresponding to the filtering rule, where the filtering rule is used to identify a packet, and the service identifier is used to identify a sequence of a service node that processes the packet. Packets with a same service identifier (ID) are processed by a same service node, and an order of the processing by the service node is the same. Packets with different service IDs are processed by a same service node, and an order of the processing by the service node is different; or packets with different service IDs are processed by different service nodes. Further, in specific implementation of this embodiment of the present disclosure, if two different service IDs are allocated to two different packets in a same packet flow, it means that although service processing that needs to be performed on the two different packets is the same, the packet flow is processed by different service node instances. In this way, load balancing may be implemented for packet processing. For example, the two different packets are first processed by a firewall, and then processed by a NAT device, but are processed by different service nodes. In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall 1 and then processed by a NAT device 1. Another service ID is allocated to packets, of which protocol numbers are less than or equal to 50, in the same packet flow, where the service ID is used to identify that the packets are first processed by a firewall 2 and then processed by a NAT device 2. In this way, it helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

According to the traffic classifier provided in this embodiment of the present disclosure, a service identifier is added to a received packet according to policy information, so that a service routing trigger controls and triggers, according to the service identifier, a service node in a service node sequence corresponding to the service identifier to process the packet to which the service identifier is added, which implements service processing on the packet.

Embodiment 9

Figure 8:
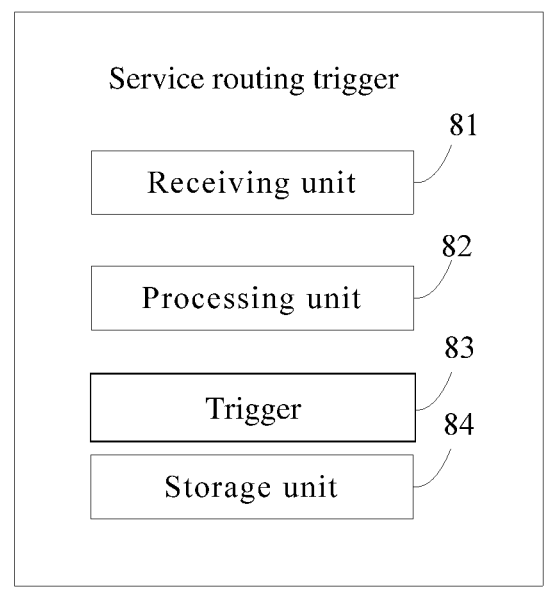
FIG. 8 is a schematic structural diagram of a service routing trigger according to Embodiment 9 of the present disclosure.

As shown in FIG. 8, this embodiment of the present disclosure provides a service routing trigger, including a receiving unit 81, a processing unit 82, and a triggering unit 83.

The receiving unit 81 is configured to receive a first packet, where the first packet carries a first service identifier.

For example, the first service identifier that matches the first packet may be carried in a header of the first packet, or the first service identifier may be carried in a payload of the first packet.

By using an example in which the first packet is an Ethernet packet, the first service identifier may be added to a new header option of the first packet, or may be added to an IP header of the Ethernet packet; or an existing field in the header of the first packet may be reused, that is, a meaning of the existing field is changed to indicate that the first packet carries the first service identifier. For example, a VLAN identifier (also referred to as VLAN ID) of a virtual local area network (VLAN) or of a QINQ (IEEE 802.1Q in IEEE 802.1Q, also referred to as Stacked VLAN or Double VLAN), or a label (also referred to as LABEL) in Multiprotocol Label Switching (MPLS) may be reused, or a part or all of a source MAC address may be escaped for reuse. A format of the new header option of the first packet is shown in Table 1: A type field is added between the source MAC address and the VLAN ID to indicate whether the first packet carries a service identifier and the first service identifier. For example, it may be defined as follows: When a type value is 0, it indicates that the first packet does not carry a service identifier, and in this case, a value of the service ID is 0; and when a type value is 1, it indicates that the first packet carries a service identifier, and in this case, the value of the service ID is the first service identifier carried in the first packet.

The processing unit 82 is configured to determine in policy information stored in the service routing trigger and according to the first service identifier, a first service node sequence that matches the first service identifier and processes the first packet, and an address of a service node in the first service node sequence.

The triggering unit 83 is configured to successively trigger, according to the first service node sequence, one or more service nodes in the first service node sequence to process the first packet.

Optionally, the service routing trigger may further include a storage unit 84, where the storage unit 84 is configured to store the policy information.

Optionally, the receiving unit 81 is configured to receive the policy information sent by a controller.

Optionally, the policy information may include: a service identifier, a service node sequence that matches the service identifier and processes a packet, and an address of a service node in the service node sequence, and the service identifier is used to represent a sequence of a service node that processes the packet.

Optionally, the policy information further includes an address of a next-hop node of the service node sequence.

In specific implementation of this embodiment of the present disclosure, the controller may allocate a service processing policy based on a packet flow. The controller delivers policy information to a service node instance according to a service processing policy corresponding to a packet flow. Packets with a same service ID are processed by a same service node, and orders of the processing by the service node instance is the same. For example, a packet whose service ID=1 is first processed by a first service node 16, and then processed by a second service node instance 18; however, a packet whose service ID=2 is first processed by the second service node instance 18, and then processed by the first service node 16. Optionally, if two different service IDs are allocated to two different packets in a same packet flow, it means that although service processing that needs to be performed on the two different packets is the same, for example, first processing by using a firewall and then processing by using a NAT device on both packets, the two packets are processed by different service node instances. In this way, load balancing may be implemented for packet processing. Optionally, packets in a packet flow may be classified to implement load balancing of processing on a same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps to implement load balancing of processing on a same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly, different service IDs may also be allocated to the packets in the packet flow 1 and the packets in the packet flow 2, which helps to implement load balancing.

A first service node may be a logical functional entity. It should be noted that a service node instance generally has a reachable address, for example, a reachable IP address or MAC address. In this way, whether a first service node is a physical entity or a logical entity is not limited in this embodiment of the present disclosure, as long as the first service node has a reachable address. In addition, a service node instance providing a firewall function may be used as an example for illustration to help understand the service node instance. Generally, a firewall function may be installed on many servers, for example, a virtual machine VM. In this way, servers on which a firewall function is installed can all provide service processing of the firewall function, and the servers on which a firewall function is installed have different addresses. In this way, each server on which a firewall function is installed may be called a service node instance, that is, each service node instance includes a reachable address and can independently process at least one service. In specific implementation of this embodiment of the present disclosure, the controller determines to select the first service node to process the packet flow. For example, the controller may select, according to processing capabilities and service load conditions of service node instances, an appropriate service node instance to process the packet flow.

The receiving unit 81 further configured to receive the policy information sent by the controller.

According to the service routing trigger provided in this embodiment of the present disclosure, a packet that carries a service identifier is received, and a service node in a service node sequence corresponding to the service identifier is controlled and triggered to process the packet, which implements service processing on a packet flow.

Embodiment 10

Figure 9:
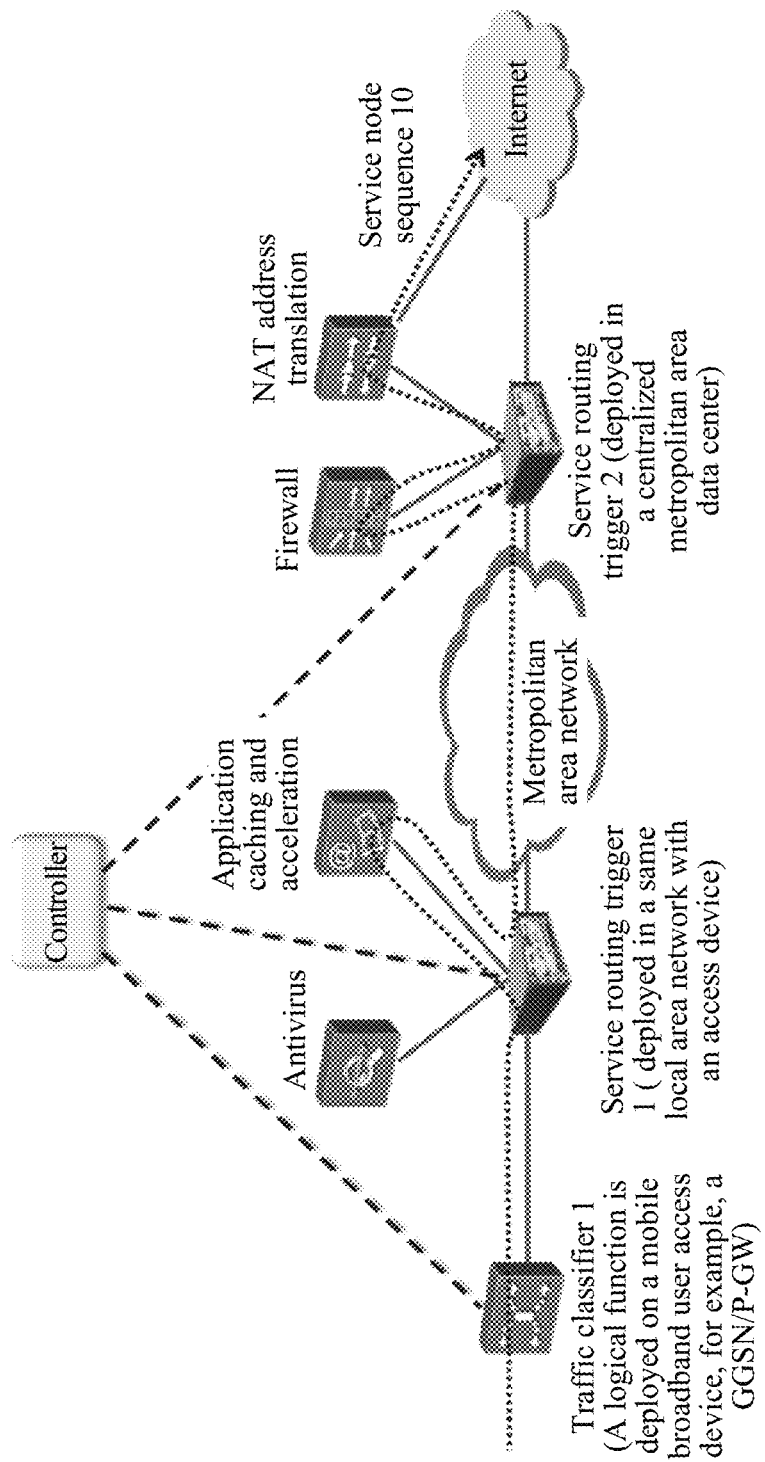
FIG. 9 is a schematic diagram of a scenario in which technical solutions in Embodiment 10 of the present disclosure are applied in the mobile broadband field.

A scenario in which technical solutions in this embodiment of the present disclosure are applied in the mobile broadband field is shown in FIG. 9. FIG. 9 provides an example in which technical solutions in this embodiment of the present disclosure are applied in mobile broadband access. A function of a traffic classifier is deployed on a mobile broadband user access device, for example, on a GGSN/P-GW, and two service routing triggers to which different value-added services are connected are separately deployed. A service routing trigger 1 and an access device are on a same local area network, and a service routing trigger 2 is deployed in a centralized metropolitan area data center. A service node sequence for a packet flow for uplink Web access requires processing by three service nodes: an application cache acceleration node, a firewall, and NAT address translation.

A service node sequence 10 includes: a service node 1 that processes application cache acceleration, a service node 2 that performs firewall processing, and a service node 3 that performs NAT address translation processing on a packet. An order based on which service nodes in the service node sequence 10 process a packet is: the service node 1→the service node 2→the service node 3. An address of the service node 1, an address of the service node 2, an address of the service node 3, and the service node sequence 10 may be prestored in a controller, or be prestored in a policy database that can be accessed by the controller.

The controller performs a policy decision according to the service node sequence 10, subscription information, and relevant physical deployment information of a service node in the service node sequence. Physical deployment information of the service node sequence 10 provided is shown in Table 2:

TABLE 2

| Service node sequence | Service identifier | Subscriber | Traffic classifier and rule | First service routing trigger and service | Second service routing trigger and service |
|---|---|---|---|---|---|
| Service node sequence 10 | 10 | All | Traffic classifier 1 and Web access filtering rule | Service routing trigger 1 Service sequence (application caching and acceleration) Next service routing trigger: service routing trigger 2 | Service routing trigger 2 Service sequence (a firewall, NAT address translation) Service chain ends |

The controller delivers first policy information to the traffic classifier, the controller delivers second policy information to the service routing trigger 1, and the controller delivers third policy information to the service routing trigger 2.

The first policy information includes: subscription information of a service node sequence, a flow filtering rule of the service node sequence, a service identifier corresponding to the service node sequence, and address information of a next-hop service node of the service node sequence. An entry that is corresponding to the service node sequence 10 and is in the first policy information includes:

subscription information of the service node sequence 10: all subscribers;

a flow filtering rule "Web access filtering rule" of the service node sequence 10, and the service identifier: 10; and address information of a next-hop service node instance: address information of the service routing trigger 1.

The second policy information delivered by the controller to the service routing trigger 1 includes: a service identifier, a service node sequence corresponding to the service identifier, an address of a node in the service node sequence corresponding to the service identifier, and address information of a next-hop service node of the service node sequence. An entry that is corresponding to the service node sequence 10 and is in the second policy information includes:

a service identifier: 10;

value-added service node sequence information corresponding to the service routing trigger 1: a first value-added service: application cache caching and acceleration, and an IP address or MAC address of a value-added service node of the application caching and acceleration; and address information of a next-hop service node: address information of the service routing trigger 2.

The third policy information delivered by the controller to the service routing trigger 2 includes: a service identifier, a service node sequence corresponding to the service identifier, an address of a node in the service node sequence corresponding to the service identifier, and a service chain end identifier. An entry that is corresponding to the service node sequence 10 and is in the third policy information includes:

a service identifier: 10;

value-added service node sequence information corresponding to the service routing trigger 2:

a first value-added service: a firewall, and an IP address or MAC address of a value-added service node of the firewall;

a second value-added service: NAT address translation, and an IP address or MAC address of a value-added service node of the NAT address translation; and a service chain end identifier.

The traffic classifier 1 performs classification on received user service packets according to the flow filtering rule "Web access filtering rule" in the first policy information and information that a subscriber subscribes to the service node sequence 10. If it is determined that a first packet, after being filtered by the traffic classifier 1, needs to be processed by the service node sequence 10 corresponding to the service identifier 10, the service identifier 10 is encapsulated into the first packet, and a first packet into which the service identifier 10 is encapsulated is sent to a next-hop service routing trigger 1. Optionally, the service identifier 10 may be encapsulated into a source MAC address field in the first packet.

The service routing trigger 1 receives the first packet that carries the service identifier 10, and determines, in the second policy information and according to the service identifier 10, the service node sequence 10 corresponding to the service identifier 10, and an address of the service routing trigger 2; then, after the service routing trigger 1 triggers the service node 1 that is corresponding to the service routing trigger 1 and is in the service node sequence 10 to process the first packet, the service routing trigger 1 sends, to the service routing trigger 2, a first packet processed by a node in the service node sequence 10.

If the service node 1 supports a manner of transparent Ethernet networking, a user service packet whose source MAC address carries the service identifier 10 is sent to the service node 1 for processing of application caching and acceleration.

The service routing trigger 1 acquires the service identifier 10 from the source MAC address field of the service packet returned by the service node 1, and sends the user service packet whose source MAC address carries the service identifier 10 to the service routing trigger 2 by using a pre-established VxLAN tunnel.

The service routing trigger 2 receives the user service packet whose source MAC address carries the service identifier 10, and determines, in the third policy information and according to the service identifier 10, that the service node sequence 10 corresponding to the service identifier 10 is the service node 2 (a firewall)→the service node 3 (NAT address translation) in a service node sequence corresponding to the service routing trigger 2.

If the service node 2 supports the manner of transparent Ethernet networking, a service packet whose source MAC address carries the service identifier 10 is sent to the service node 2 for firewall processing.

When returned from the service node 2 to the service routing trigger 2, the service packet carries the service identifier 10, and the service routing trigger 2 sends, to the service node 3, according to an address of a next service node 3 in the service node sequence 10, the service packet that carries the service identifier 10 for NAT address translation address processing.

A NAT address translation service performed by the service node 3 belongs to a non-transparent value-added service. The NAT address translation service performed by the service node 3 changes a source IP address of a service packet, and after a value-added service of NAT address translation has been processed, a processed service packet is directly sent to the Internet network.

Embodiment 11

Figure 10:
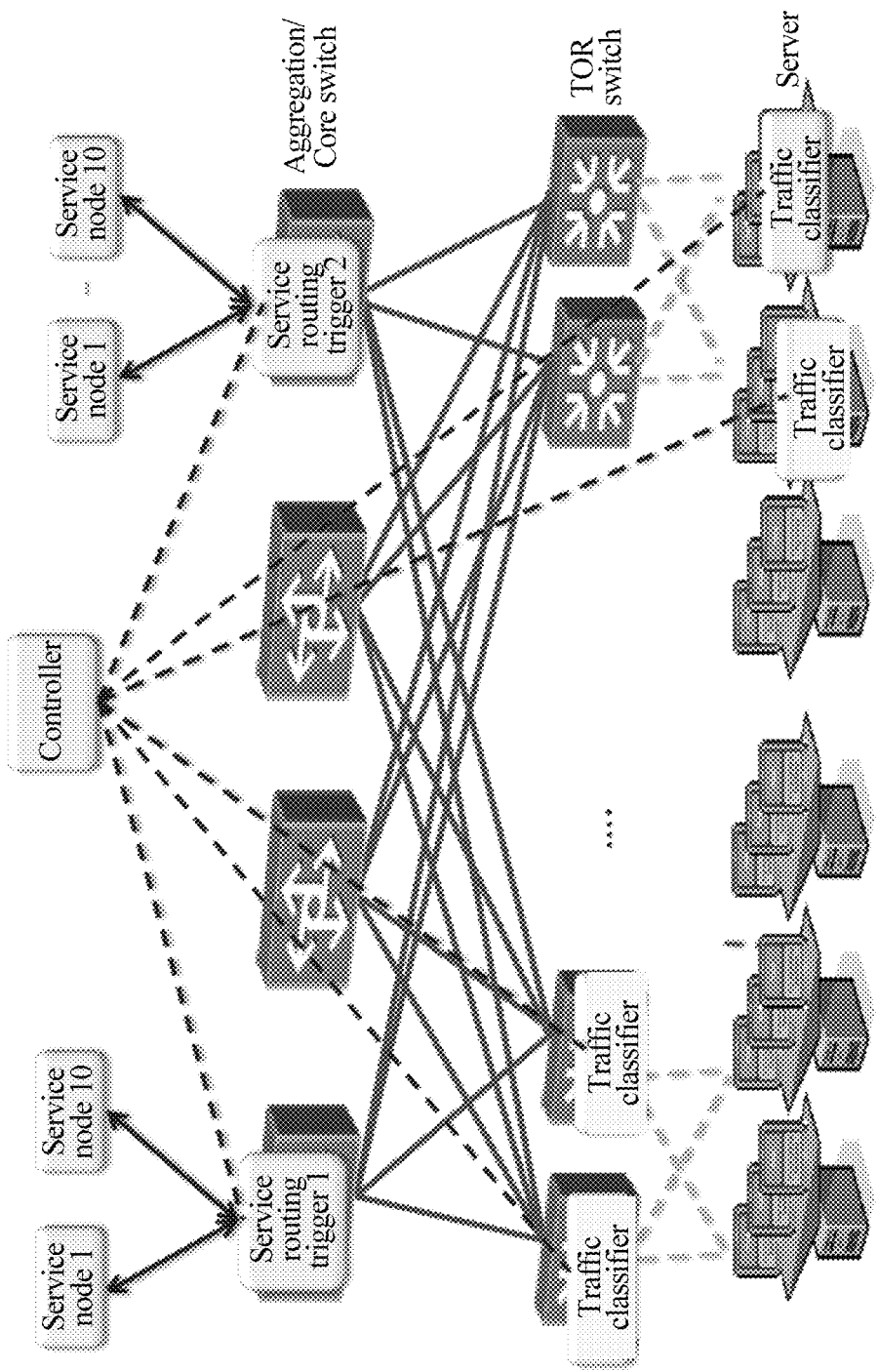
FIG. 10 is a schematic diagram of a scenario in which technical solutions in Embodiment 11 of the present disclosure are applied in a multi-tenant data center.

As shown in FIG. 10, technical solutions in this embodiment of the present disclosure may also be applied in a multi-tenant data center scenario. In an application scenario of a public cloud data center, one physical data center is rented to multiple tenants for use, and there may be many tenants, for example, on a data center network that applies a VxLAN (virtual extensible local area network) technology for multi-tenant separation, a quantity of tenants may be more than 16,000,000. When hosts or virtual machines between different subnets of a same tenant interwork with each other, a value-added service node such as a firewall is needed for processing, and different tenants may require different value-added service nodes of firewalls for processing. However, an existing value-added service node device, for example, a device such as a firewall, may not support a latest multi-tenant separation technology (for example, VxLAN) for tenant service separation, or it is difficult for a single physical device to support more than 16,000,000 virtual service node instances. Assuming that an existing value-added service device allows to mark 4K virtual value-added service instances by using a VLAN (Virtual Local Area Network), it may be avoided, by using this technical solution, that a value-added service device needs to be upgraded to support the VxLAN multi-tenant separation technology.

As shown in FIG. 10, a service routing trigger is deployed on an aggregation switch or a core switch, and a traffic classifier functional entity is deployed on a ToR (Top Of Rack) switch or a vSwitch (virtual switch) in a server. It is assumed that a firewall value-added service is needed for processing when hosts or virtual machines between different subnets of a same tenant interwork with each other, and each service node device in FIG. 11 has a function of processing of a firewall value-added service, and further allows to mark 4K virtual value-added service instances by using a VLAN. If ten service node devices are connected to a service routing trigger instance, by using 40K as a unit, service flows, for which interworking of subnets is needed, of different 40K tenants may be directed to different service routing triggers under control of a controller. When sending a packet to a service node, the service routing trigger may add a VLAN mark to the packet according to a VLAN identifier delivered by the controller, so as to perform multi-instance differentiation processing. The following uses a subnet interworking service flow of a tenant 100 as an example to describe a specific implementation process.

A service node sequence 100 (firewalls) may be prestored in the controller, or prestored in advance in a policy database that can be accessed by the controller.

The controller performs a policy decision according to information about the service node sequence 100, subscription information, and physical deployment information of a service node in a service node sequence. Physical deployment information of the service node sequence 100 provided is shown in Table 3:

TABLE 3

| Service node sequence | Service identifier | Subscriber | Traffic classifier and rule | First service routing trigger and service |
|---|---|---|---|---|
| Service node sequence 100 | 100 | Tenant 100 | All traffic classifiers and subnet interworking filtering rule of a tenant 100 | Service routing trigger 1 Service sequence (firewall: service node 1, VLAN identifier 101 of a corresponding tenant) Service node sequence ends |

The controller delivers first policy information to a traffic classifier, and the controller delivers second policy information to a service routing trigger.

The first policy information that is related to the service node sequence 100 and is delivered by the controller to the traffic classifier includes:

a flow filtering rule of a service chain 10: "subnet interworking filtering rule of the tenant 100";

a service identifier: 100;

a tenant identifier: 100; and address information of a next-hop service node instance: address information of the service routing trigger 1.

The second policy information delivered by the controller to the service routing trigger 1 includes:

a service identifier: 100;

a tenant identifier: 100; and value-added service node sequence information corresponding to the service routing trigger 1:

a first value-added service: firewall and subnet interworking routing processing, an IP address or MAC address of the service node 1, and the VLAN identifier 101 of a corresponding tenant; and a service node sequence end identifier.

The traffic classifier performs classification according to the flow filtering rule "subnet interworking filtering rule of the tenant 100", which is in the first policy information, of the service routing sequence 100; encapsulates the service identifier 100 into a source MAC address field of a user service packet that is classified by the traffic classifier and belongs to the service node sequence 100; performs encapsulation of a VxLAN tunnel on a user service packet into which the service identifier 100 is encapsulated; encapsulates the tenant identifier 100 into a VxLAN tenant identifier of the VxLAN tunnel; and finally, sends, to the service routing trigger 1, a user service packet into which the service identifier 100 and the tenant identifier 100 are encapsulated.

The service routing trigger 1 receives the user service packet whose source MAC address carries the service identifier 100 and whose VxLAN tenant identifier carries the tenant identifier 100; performs service triggering control according to a value-added service sequence (a firewall), which is in the service routing trigger 1, of a service node sequence corresponding to the service identifier 100 in the second policy information; decapsulates the VxLAN tunnel; adds the VLAN identifier 101 to an Ethernet packet that is transmitted in the tunnel and whose source MAC address carries the service identifier 100; and sends the Ethernet packet to the service node 1.

After completing firewall value-added service processing, the source MAC address of the service packet returned by the service node 1 to the service routing trigger 1 carries the service identifier 100, and a VLAN identifier field carries the VLAN identifier 101. It is determined, according to the second policy information, that the service node sequence ends; then, according to a correspondence between the tenant identifier 100 and the VLAN identifier 101 in the second policy information, the VLAN identifier field is removed, the VxLAN tunnel is encapsulated, the tenant identifier 100 is encapsulated into the VxLAN tenant identifier of the VxLAN tunnel ID, and then routing and forwarding to another subnet of the tenant are performed.

According to the technical solutions in embodiments of the present disclosure, on-demand tandem connection of a value-added service in a service node sequence may be resolved, and there is no additional function requirement on the value-added service, which facilitates access by using a third-party value-added service interface. When the technical solutions in the embodiments of the present disclosure are applied, a service node in a service chain may be a third-party service node, which helps to inherit and reuse existing service node investments. The service node may be decoupled from bottom-layer network control, and the service node only needs to focus on specific service implementation, which makes it possible for more software vendors to enter the service field, enriches a service product chain, enhances competitive strength, and stimulates production of value-added service products with good quality and low price.

The embodiments of the present disclosure further provide a service chain technical solution in which a basic network supports multiple tenants. A problem of on-demand tandem connection of a value-added service in a service chain when a bottom-layer network supports multiple tenants may be resolved, so that service chain technical solutions are deployable and implementable in a network scenario of supporting multiple tenants. In addition, a value-added service does not need to support a latest multi-tenant technology, for example, a VxLAN (Virtual eXtensible Local Area Network) technology, so that an existing value-added service device, or a value-added service device that supports multiple instances may be still applied when the latest multi-tenant technology is supported, and avoids requirements for upgrade and reconstruction of a value-added service device when the latest multi-tenant technology is supported.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet processing system, comprising:
   a traffic classifier; and
   a first service routing trigger;
   wherein the traffic classifier is configured to receive first policy information from a controller;
   wherein the first policy information comprises a filtering rule, an address that corresponds to the filtering rule and that is of a service routing trigger, and a service identifier corresponding to the filtering rule, wherein the filtering rule is used to identify a packet, and wherein the service identifier is a Multiprotocol Label Switching (MPLS) label and represents a sequence of service nodes that will process the packet;
   wherein the first service routing trigger is configured to receive second policy information from the controller, wherein the second policy information comprises the service identifier and a service node sequence corresponding to the service identifier;
   wherein the traffic classifier is further configured to:
      receive a first packet that excludes the service identifier, wherein the service identifier does not include a source address (SA);
      determine, in the first policy information and according to a first filtering rule that matches the first packet, that the service identifier matches the first filtering rule, and determine an address that matches the first filtering rule and is of the first service routing trigger;
      add the service identifier to the first packet to form a second packet, wherein an existing field used to indicate, in a header of the packet, a portion of a source media access control (MAC) address is reused to have a value indicating the existence of the service identifier; and
      send the second packet to the first service routing trigger; and
   wherein the first service routing trigger is further configured to:
      determine, in the second policy information and according to the service identifier carried in the second packet, a first service node sequence that matches the service identifier;
      send the second packet to a first service node in the first service node sequence;

receive the second packet processed by the first service node; and trigger, according to an order of service nodes in the first service node sequence, a second service node in the first service node sequence after the first service node to process the second packet.

2. The system according to claim 1, wherein the first policy information further comprises a tenant identifier; and wherein the service identifier corresponds to the filtering rule and the tenant identifier.

3. The system according to claim 2, wherein the traffic classifier is further configured to:

determine, in the first policy information and according to a first tenant identifier corresponding to the first filtering rule and the first packet, the service identifier that matches the first filtering rule and the first tenant identifier, and determine an address that matches the first filtering rule and the first tenant identifier and is of the first service routing trigger.

4. The system according to claim 1, wherein the second policy information further comprises an address of a next-hop node of the service node sequence corresponding to the service identifier.

5. A packet processing system, comprising:
a traffic classifier;
a first service routing trigger; and
a second service routing trigger;
wherein the traffic classifier is configured to receive first policy information from a controller, wherein the first policy information comprises a filtering rule, an address that corresponds to the filtering rule and that is of a service routing trigger, and a service identifier corresponding to the filtering rule, wherein the filtering rule is used to identify a packet, and wherein the service identifier is a Multiprotocol Label Switching (MPLS) label and represents a sequence of service nodes that processes the packet;
wherein the first service routing trigger is configured to receive second policy information from the controller, wherein the second policy information comprises the service identifier, and a first part that is triggered by the first service routing trigger and is of a service node sequence corresponding to the service identifier;
wherein the second service routing trigger is configured to receive third policy information from the controller, wherein the third policy information comprises the service identifier, and a second part that is triggered by the second service routing trigger and is of the service node sequence corresponding to the service identifier;
wherein the traffic classifier is further configured to:
receive a first packet that excludes the service identifier, wherein the service identifier does not include a source address (SA);
determine, in the first policy information and according to a first filtering rule that matches the first packet, that the service identifier matches the first filtering rule;
determine an address that matches the first filtering rule and is of the first service routing trigger;
determine an address that matches the first filtering rule and is of the second service routing trigger;
add the service identifier to the first packet to form a second packet, wherein an existing field used to indicate, in a header of the packet, a portion of a source media access control (MAC) address is reused to have a value indicating the existence of the service identifier;

send the second packet to the first service routing trigger, determine, in the second policy information and according to the service identifier carried in the second packet, a first service node sequence that matches the service identifier;

send the second packet to a first service node in the first service node sequence;

receive the second packet processed by the first service node; and trigger, according to an order of service nodes in the first service node sequence, a second service node in the first service node sequence after the first service node to process the second packet.

6. The system according to claim 5, wherein the first policy information further comprises a tenant identifier; and wherein the service identifier corresponds to the filtering rule and the tenant identifier.

7. The system according to claim 6, wherein the traffic classifier is further configured to:

determine, in the first policy information and according to a first tenant identifier corresponding to the first filtering rule and the first packet, the service identifier that matches the first filtering rule and the first tenant identifier; and determine the address that matches the first filtering rule and is of the first service routing trigger.

8. The system according to claim 5, wherein the second policy information further comprises an address of a next-hop node of the service node sequence corresponding to the service identifier.

9. A packet processing method, comprising:
receiving, by a traffic classifier, a first packet that excludes a service identifier;
determining, by the traffic classifier, in policy information stored in the traffic classifier and according to a first filtering rule that matches the first packet, that the service identifier matches the first filtering rule, and determining an address that matches the first filtering rule and is of a first service routing trigger, wherein the service identifier does not include a source address (SA), wherein the policy information comprises: a filtering rule, the address of the first service routing trigger, and the service identifier corresponding to the filtering rule, wherein the filtering rule is used to identify a packet, and wherein the service identifier is a Multiprotocol Label Switching (MPLS) label and represents a sequence of service nodes that process the packet;
adding, by the traffic classifier, the service identifier to the first packet to form a second packet, wherein an existing field used to indicate, in a header of the packet, a portion of a source media access control (MAC) address is reused to have a value indicating the existence of the service identifier; and
sending, by the traffic classifier, the second packet to the first service routing trigger.

10. The method according to claim 9, wherein the policy information further comprises a tenant identifier, and the service identifier corresponds to the filtering rule and the tenant identifier; and
wherein the determining the service identifier by the traffic classifier comprises determining, by the traffic classifier, in the policy information and according to a first tenant identifier corresponding to the first filtering rule and the first packet, the service identifier that matches the first filtering rule and the first tenant identifier, and determining the address of the first service routing trigger.

11. The method according to claim 9, wherein before the receiving, by the traffic classifier, the first packet, the method further comprises:
receiving, by the traffic classifier, the policy information sent by a controller.

12. A traffic classifier, comprising:
a processor; and
a non-transitory computer-readable storage medium storing a program to be executed by the processor, the program including instructions to:
receive a first packet that excludes a service identifier;
determine, in policy information stored in the traffic classifier and according to a first filtering rule that matches the first packet, that the service identifier matches the first filtering rule, and determine an address that matches the first filtering rule and is of a first service routing trigger, wherein the service identifier does not include a source address (SA), wherein the policy information comprises a filtering rule, the address of the first service routing trigger, and the service identifier corresponding to the filtering rule, wherein the filtering rule is used to identify a packet, and wherein the service identifier is a Multiprotocol Label Switching (MPLS) label and represents a sequence of a service node that processes the packet;
add the service identifier to the first packet to form a second packet, wherein an existing field used to indicate, in a header of the packet, a portion of a source media access control (MAC) address is reused to have a value indicating the existence of the service identifier; and
send the second packet to the first service routing trigger.

13. The traffic classifier according to claim 12, wherein the policy information further comprises a tenant identifier, and the service identifier is corresponding to the filtering rule and the tenant identifier; and
wherein the instructions to determine the service identifier by the traffic classifier include instructions to determine, by the traffic classifier, in the policy information and according to a first tenant identifier corresponding to the first filtering rule and the first packet, the service identifier that matches the first filtering rule and the first tenant identifier, and determine the address of the first service routing trigger.

* * * * *